United States Patent
Hatano et al.

[11] Patent Number: 5,933,196
[45] Date of Patent: Aug. 3, 1999

[54] PIXEL CONVERSION APPARATUS

[75] Inventors: Takahisa Hatano; Taro Funamoto; Fumiou Kameoka; Yoshikuni Shindo, all of Sapporo, Japan

[73] Assignee: Matsushita Electric Industrial Co., Ltd., Osaka, Japan

[21] Appl. No.: 08/811,504

[22] Filed: Mar. 4, 1997

[30] Foreign Application Priority Data

| Mar. 6, 1996 | [JP] | Japan | 8-048604 |
| Mar. 6, 1996 | [JP] | Japan | 8-048605 |
| Mar. 7, 1996 | [JP] | Japan | 8-049936 |
| Mar. 7, 1996 | [JP] | Japan | 8-049937 |

[51] Int. Cl.$^6$ ............................................. H04N 7/01
[52] U.S. Cl. ..................... 348/441; 348/581; 348/458
[58] Field of Search ........................... 348/441, 581, 348/458, 459, 500, 561, 550, 536, 542

[56] References Cited

U.S. PATENT DOCUMENTS

| 4,831,441 | 5/1989 | Ando . | |
| 4,872,054 | 10/1989 | Gray | 348/441 |
| 5,095,280 | 3/1992 | Wunner et al. . | |
| 5,283,651 | 2/1994 | Ishizuka . | |
| 5,327,125 | 7/1994 | Iwase et al. | 348/441 |
| 5,331,346 | 7/1994 | Shields et al. | 348/441 |
| 5,335,074 | 8/1994 | Stec | 348/537 |
| 5,473,382 | 12/1995 | Nohmi et al. . | |
| 5,621,478 | 4/1997 | Demmer | 348/441 |

OTHER PUBLICATIONS

"Application of the Digital Signal Operation", *Society of Electronic Communication*, May 20, 1981 (with partial English translation).

*Primary Examiner*—Victor R. Kostak
*Attorney, Agent, or Firm*—Ratner & Prestia

[57] ABSTRACT

A pixel conversion apparatus includes a sync separator for separating a sync signal from an input signal, a pixel conversion information analyzer for analyzing how to convert the number of pixels to display the input signal as an image from the input signal and a picture display area, a timing signal generator for generating a timing signal for displaying an image according to the outputs of the sync separator and the pixel conversion information analyzer, a pixel converter for processing a pixel conversion of the input signal according to the output of the timing signal generator, an interpolator for processing a pixel interpolation when the pixel to be interpolated generated by pixel conversion at the pixel converter, and a sync signal generator for generating a sync signal for displaying the input signal as an image. Because the relation between the input signal and the image display area is previously analyzed and processed, there is no lack, or display by mistake, of image information included in the input signal and a high quality image can be effectively displayed on the picture display area of the display device.

2 Claims, 29 Drawing Sheets

INPUT VIDEO SIGNAL

OUTPUT OF DELAY DEVICE 134

DELAY DEVICE 135

INTERPOLATION CIRCUIT 138

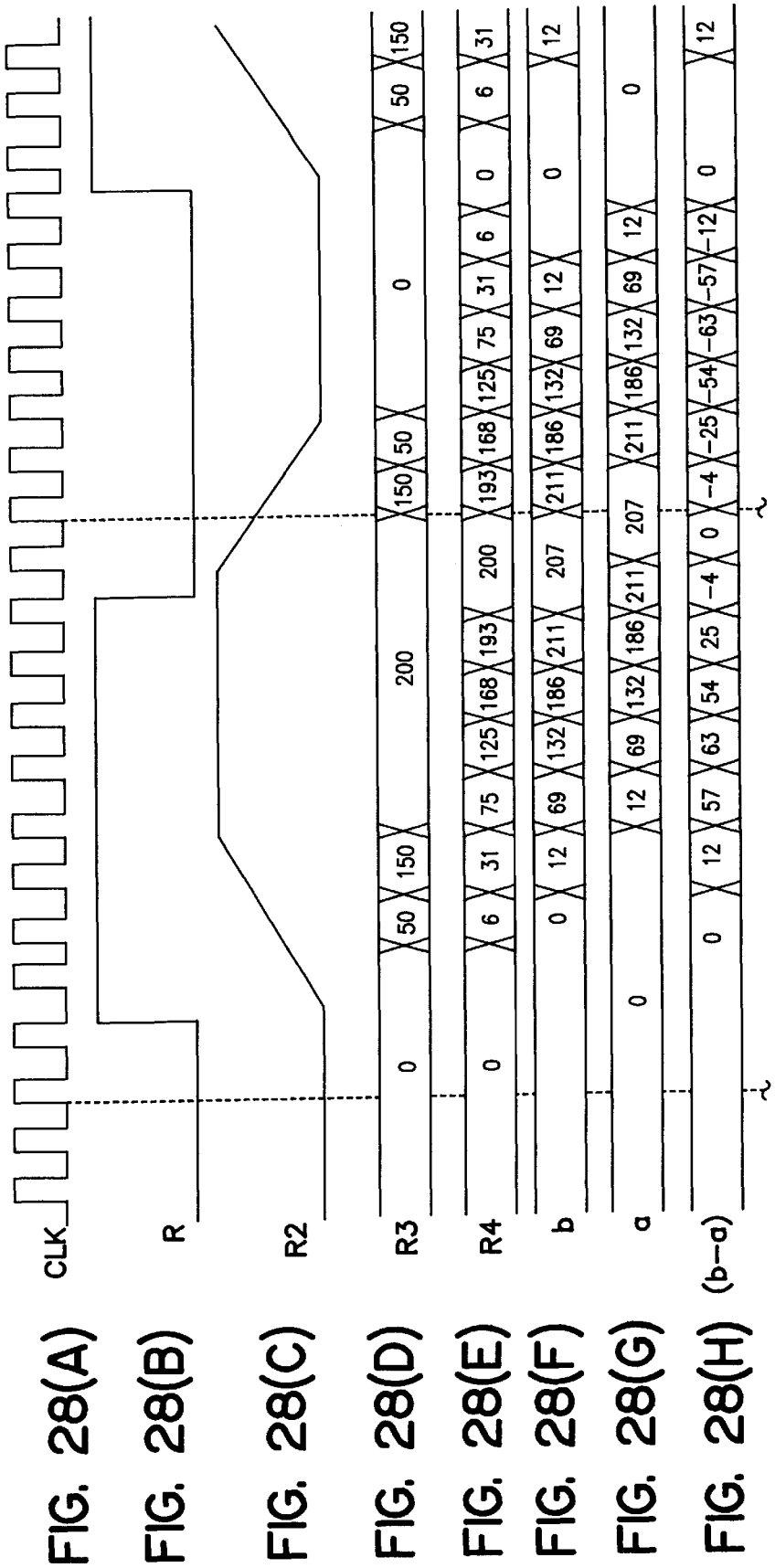

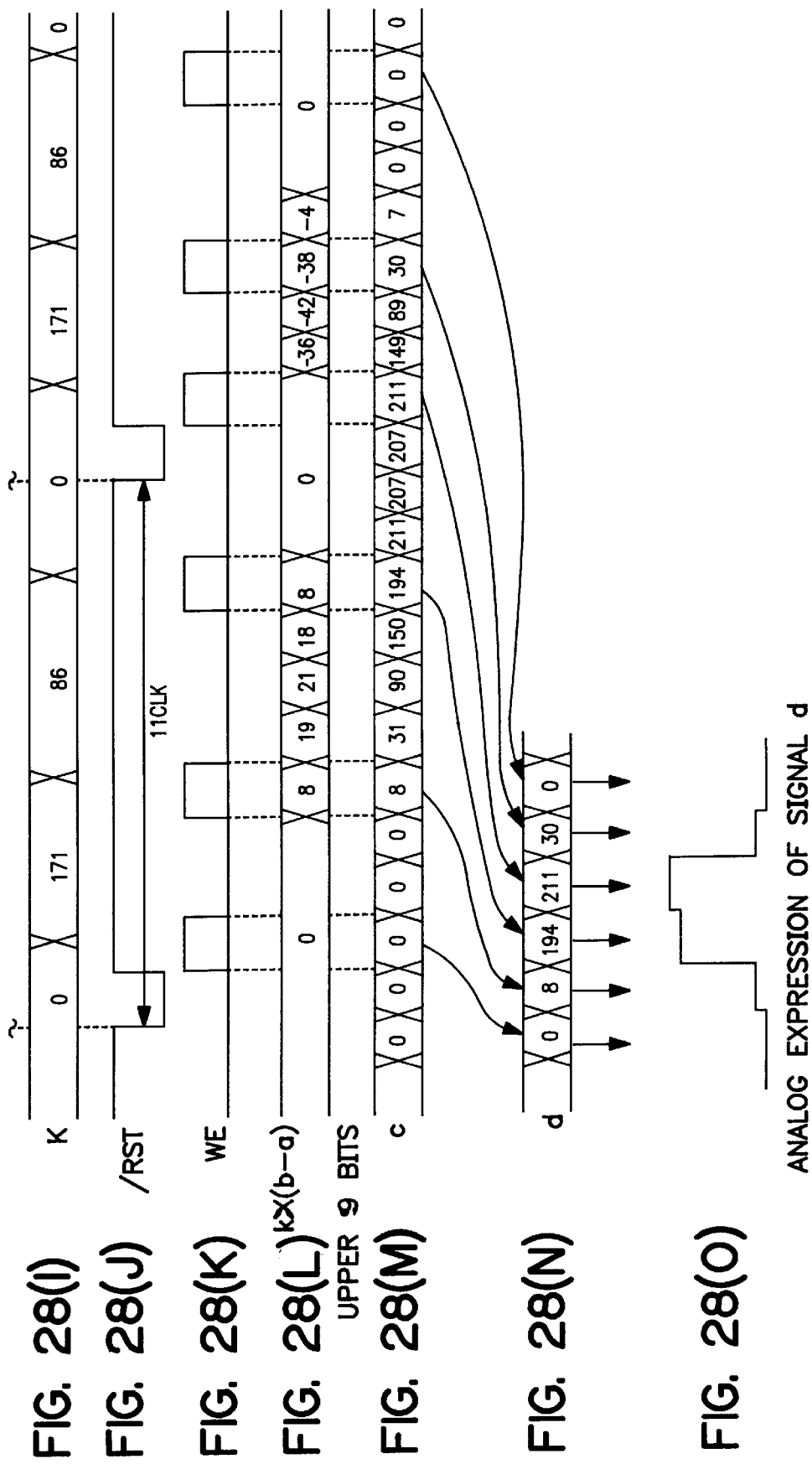

PIXEL CONVERSION APPARATUS

BACKGROUND OF THE INVENTION

The present invention relates to a pixel conversion apparatus in an electronic equipment field taking a liquid crystal display as a representative. It relates to a pixel conversion apparatus, especially used when the number of pixels of the display area is different from the number of pixels of the input signal.

For displaying a picture on a display device such as a liquid crystal panel having different number of pixels from the pixels of an input signal, a pixel conversion apparatus is used. A pixel conversion apparatus in accordance with the prior art is explained below, referring to the drawing, to explain a function of scanning line conversion.

FIG. 1 is a block diagram of a pixel conversion apparatus in accordance with the prior art in the case of a reduction conversion. FIGS. 2(a)–2(h) are charts is a chart explaining a function of interpolating reduction conversion. In FIG. 1, the block 20 is a reference counter. The block 21 is a comparator. The block 22 is a register. The block 23 is an adder. The block 24 is an interpolation circuit. The block 25 is a memory. The block 26 is an address generator. FIGS. 2(a)–2(h) show shows a functional principle at reduction factor is 0.6. In FIGS. 2(a) and 2(h) short vertical lines of input signal express sample values of the original signal and the black dots express the values necessary to be newly made by interpolation. First, a reciprocal of the reduction factor $$SH = \text{(standard picture size)}/\text{(size to be reduced)}$$

is inputted from, for example a microcomputer. In this example, $$SH = 1/0.6 = 1.67,$$

and it means that a new sample value is made at every 1.67 times of the original sampling period. In FIG. 2(c), the signal SH is applied to a ΣSH circuit 27 composed of register 22 and adder 23. ΣSH circuit 27 integrates the input signal at the output of comparator 21 at every time a coincidence pulse appears.

The integer part of the output signal of ΣSH circuit 27 which is an integral output is compared with the output of reference counter 20 (FIG. 2(b)) and comparator 21 outputs a coincidence pulse when the values are equal (FIG. 2(d)). The coincidence pulse indicates a position of a sample point to be interpolated, while the decimal part of the output signal of ΣSH circuit 27 is used as an interpolation coefficient at the moment. Thus, the sample value obtained as a result of interpolation is written (FIG. 2(e)) in a designated position on the main memory according to a writing address made from the coincidence pulse at the counter (FIG. 2(f)).

Thus, because a reduced image can be formed on the memory by interpolating new pixel data at a generation of coincidence pulse and writing in a main memory (FIG. 2(f)), if it is read at a standard speed (FIG. 2(g)) and is D/A converted, a reduced analog image signal is obtained (FIG. 2(h)). An example of a horizontal reduction is described but it is similar in a vertical reduction and in this case, a pulse synchronized with a horizontal sync signal takes a part of the clock signal.

To convert the number of sampling like this, it is necessary to calculate sampling points and interpolation coefficients for interpolation based on the reference clock (or horizontal sync pulse) and to form a data array by a memory.

Further, for example, considering a case to convert a VGA (video graphics array) standard into an XGA (extended video graphics array) standard and display it on a liquid crystal panel for XGA standard, the number of horizontal dots is 800 and the number of horizontal effective dots is 640 in the case of VGA standard. Because the number of horizontal effective dots is 1024 in the case of XGA, a signal of VGA standard can be displayed on a liquid crystal panel for XGA standard by multiplying the number of horizontal sampling by 1.6 (=1024/640).

A signal of 832 horizontal dots and 640 horizontal effective dots is included in a standard decided at VESA (Video Electronics Standards Association). When this signal is displayed for example, on a liquid crystal panel for XGA standard, if the number of horizontal effective dots is converted simply like multiplying by 1.6 (=1024/640), the number of horizontal dots becomes 1331.2 (=832×1.6), the number is an odd number with a decimal part and a normal display can not be obtained on this panel. Further, because the number of horizontal dots is larger than 1280 (standard of XGA), a part of image does not fill the specifications of a liquid crystal panel and it is sometimes impossible to display. Therefore, only the effective picture area of the converted signal is once written in a memory and only the effective picture area is read from the memory with a clock signal filling the specifications of the liquid crystal panel. In this case, it is general to adopt a method that reading clock signal is generated non-synchronized with the input signal, while the writing clock signal is synchronized with the input signal.

For a television signal such as NTSC (National Television Standard Committee), a composition to display on a panel having VGA of 640×480 pixels by doubling the number of scanning lines is generally used. In this case, to double the number of scanning lines, a composition to convert the number of scanning lines into double by writing the input signal into a FIFO (first in and first out) and reading a line twice at a double speed of the writing is generally used. The composition is simple and there is no need of a field memory and only an FIFO (line memory) is necessary but the vertical resolution deteriorates because it is not interlaced. To secure a good vertical resolution, a field memory such as movement adaptive type scanning line interpolation is necessary.

A plurality of clock signal generation circuits for writing and reading into and from a memory used for a pixel conversion of the prior art is explained below and a plurality of PLL (phase locked loop) circuits having the same composition are merely used for generating each clock signal.

FIG. 3 is a block diagram of a video display apparatus in accordance with the prior art. The block 1 is a sync separator. The block 2 is a first phase detector. The block 3 is a first LPF (low pass filter). The block 4 is a first VCO (voltage controlled oscillator). The block 5 is a first counter. The block 6 is a first PLL composed of first phase detector 2, first LPF 3, first VCO 4 and first counter 5. The block 7 is a pixel converter. The block 8 is a second phase detector. The block 9 is a second LPF. The block 10 is a second VCO. The block 11 is a second counter. The block 12 is a second PLL composed of second phase detector 8, second LPF 9, second VCO 10 and second counter 11. The block 13 is a timing signal generator.

A composite video signal inputted from an outside is supplied to pixel converter 7, an expansion or a reduction is processed by a clock signal from first PLL 6 and a clock signal from second PLL 12. (Clock signals having different frequencies are used between the input and the output.)

The composite video signal inputted from the outside is also supplied to sync separator 1 at the same time. At sync separator 1, only a sync signal is extracted from the composite video signal. A horizontal sync signal separated at sync separator 1 is supplied to first phase comparator 2. The PWM (pulse width modulation) output of first phase comparator 2 is supplied to first LPF 3. The response characteristic of first PLL 6 is almost decided at first LPF 3. Receiving an output of first LPF 3, first VCO 4 outputs a stable first clock signal. This first clock signal is used for driving a front stage of pixel converter 7. Further, the first clock signal is frequency divided at an arbitrary rate at first counter 5 and is returned to first phase detector 2. A phase difference between two input signals is detected at first phase comparator 2. The output of first counter 5 is also supplied to second phase comparator 8. The response characteristic of second PLL 12 is decided at second LPF 9.

In the case in which pixel interpolation is necessary at a pixel conversion apparatus in accordance with the prior art, what interpolation is made is explained below. A horizontal pixel conversion circuit of the prior art is explained below referring to the drawings. FIG. 4 is a block diagram of a horizontal pixel conversion circuit of the prior art. PLL circuit 42 is a circuit for faithfully reproducing a clock signal forming the input signal from the input signal and it is necessary to know previously and correctly the number of clocks per one horizontal period and the phase difference between the input signal and the clock a reproduced at PLL circuit 42 has to be adjusted. In recent years, signals outputted from computers have a lot of variety, for example the clock frequency has a wide range from about 20 MHz to over 100 MHZ. At any two computers, the numbers of clocks per one horizontal period including a blanking period are not always the same, even if the number of effective display pixels of the two computers are the same. With what clock frequency or with what number of clocks per one horizontal period, the operator of the computer or the software of the computer outputs a signal is quite arbitrary. Therefore, the oscillation frequency range of PLL circuit 42 must be wide and a lot of values must be previously stored for the number of clocks per one horizontal period.

The function of a gradation integral display circuit 43 is expressed by the following equation.

$$Qi = D(i) \times a + D(i+1) \times b + D(i+2) \times c + D(i+3) \times d$$

Where, Qi is the i-th data after pixel conversion. D(i+1), D(i+2) and D(i+3) are the D(i+1)-th, the D(i+2)-th and the D(i+3)-th data before conversion, respectively. For example, the values a, b, c and d of the input signal are decided by a ratio of number of pixels between before and after conversion and is obtained by calculating a contribution factor of the data before conversion against the data after conversion. An example of the gradation integral display at a conversion from five pixels to four pixels is shown in FIGS. 5(*a*) and 5(*b*). As shown in FIG. 5(*a*), the five pixels before conversion are divided into four equal parts and, as shown in FIG. 5(*b*), new brightness values for the four pixels are obtained by integrating each brightness value at each divided area. Information which originally one pixel had is reflected to one or two pixels after pixel conversion.

SUMMARY OF THE INVENTION

The present invention relates to a pixel conversion apparatus which can effectively display an input video signal after pixel conversion on an image display area.

A pixel conversion apparatus in accordance with the present invention includes:

sync separation means for separating a sync signal from an input signal, pixel conversion information analysis means for analyzing how to convert the number of pixels to display the input signal as an image from the input signal and a picture display area, timing signal generation means for generating a timing signal for displaying an image according to the outputs of the sync separation means and the pixel conversion information analysis means, pixel conversion means for processing a pixel conversion of the input signal according to the output of the timing signal generation means, interpolation means for processing a pixel interpolation when pixel to be interpolated generates by pixel conversion at the pixel conversion means, and sync signal generation means for generating a sync signal for displaying the input signal as an image.

Because the relation between the input signal and the image display area is previously analyzed and processed, there is no lack or display by mistake of image information included in the input signal and a high quality image can be effectively displayed on the picture display area of the display device.

Especially, the pixel conversion information analysis means discriminates the number of pixels and the effective display area of the input signal and the blanking period of the picture displaying the input signal is calculated from the discrimination result and the picture display area, the horizontal sync signal from the sync signal generation means is made different from the effective picture area in blanking period.

It means that because the input signal picture information can not be displayed on the picture display area of the display device, the picture is not displayed with any cut or intermittently. Expressing as scanning line conversion, scanning line conversion which can display on a display device such as a liquid crystal panel without frame frequency conversion can be realized.

Especially, the pixel conversion information analysis means discriminates which the input video signal is interlaced or non-interlaced, discriminates which the interlaced signal is in an odd field or in an even field and the interpolation means processes a different interpolation between for an odd field and for an even field according to the discrimination result of odd/even field. Thus, because the picture information is correctly reproduced for a pixel conversion even when the input video signal is interlaced, a display can be obtained without deterioration in vertical resolution.

Especially, the pixel conversion information analysis means calculates a plurality of clocks necessary for pixel conversion and the timing signal generation means gives a designated modulation to at least one clock of the plurality of clocks. Thus, even a plurality of clock generators are provided for pixel conversion, beat interference such as a striped pattern on the display due to frequency interference can be prevented by making the above processing on one of clock generators having near frequencies. The effect to reduce beat interference is great in a picture display apparatus synchronizing with a frame frequency and having a non-synchronous clock, especially in a liquid crystal display device.

Especially, the pixel conversion information analysis means calculates a pixel conversion ratio and provides with control means for controlling memory writing of the pixels interpolated by the interpolation means according to the calculation result. Thus, because the pixel interpolation and the pixel conversion are done at a sampling clock having a sufficiently high frequency according to the calculation result of the pixel conversion ratio, a pixel converted picture display can be obtained with higher quality. That is, by using a clock having a higher frequency than the clock forming an input video signal as a sampling clock of the A/D converter, it features to decrease the number of pixels to the desired number of pixels processing interpolation between pixels, after the number of horizontal pixels to more than the desired number of pixels is once increased. Because it is unnecessary to correctly know the frequency of the clock forming a video signal outputted from a computer or the like (the number of clocks per one horizontal period) and the phase difference of the clock from the video signal, previous adjustment of the circuit and previous survey of signal systems of computer are not necessary and stable pixel conversion can be realized for any signals.

BRIEF DESCRIPTION OF THE DRAWINGS

FIG. 8(a) image area of an original signal

FIG. 8(b) image area of a signal 1 after conversion

FIG. 11(a) a relation between writing and reading at a non-synchronous conversion FIG. 11(b) a relation between writing and reading at a synchronous conversion

FIG. 12(a) a memory writing period before conversion

FIG. 12(b) a memory writing period after conversion

FIG. 15(a) the case an original signal is progressive.

FIG. 15(b) the case of interlaced conversion as usual processing.

FIG. 15(c) the case of non-interlaced conversion as usual processing.

FIGS. 28(a)–28(o) are timing charts explaining a function of a horizontal pixel conversion circuit in accordance with the eighth exemplary embodiment of the present invention.

DESCRIPTION OF THE PREFERRED EMBODIMENTS

Exemplary embodiments of the present invention are explained below referring to FIGS. 6–12.

(First exemplary embodiment)

Figure 6:
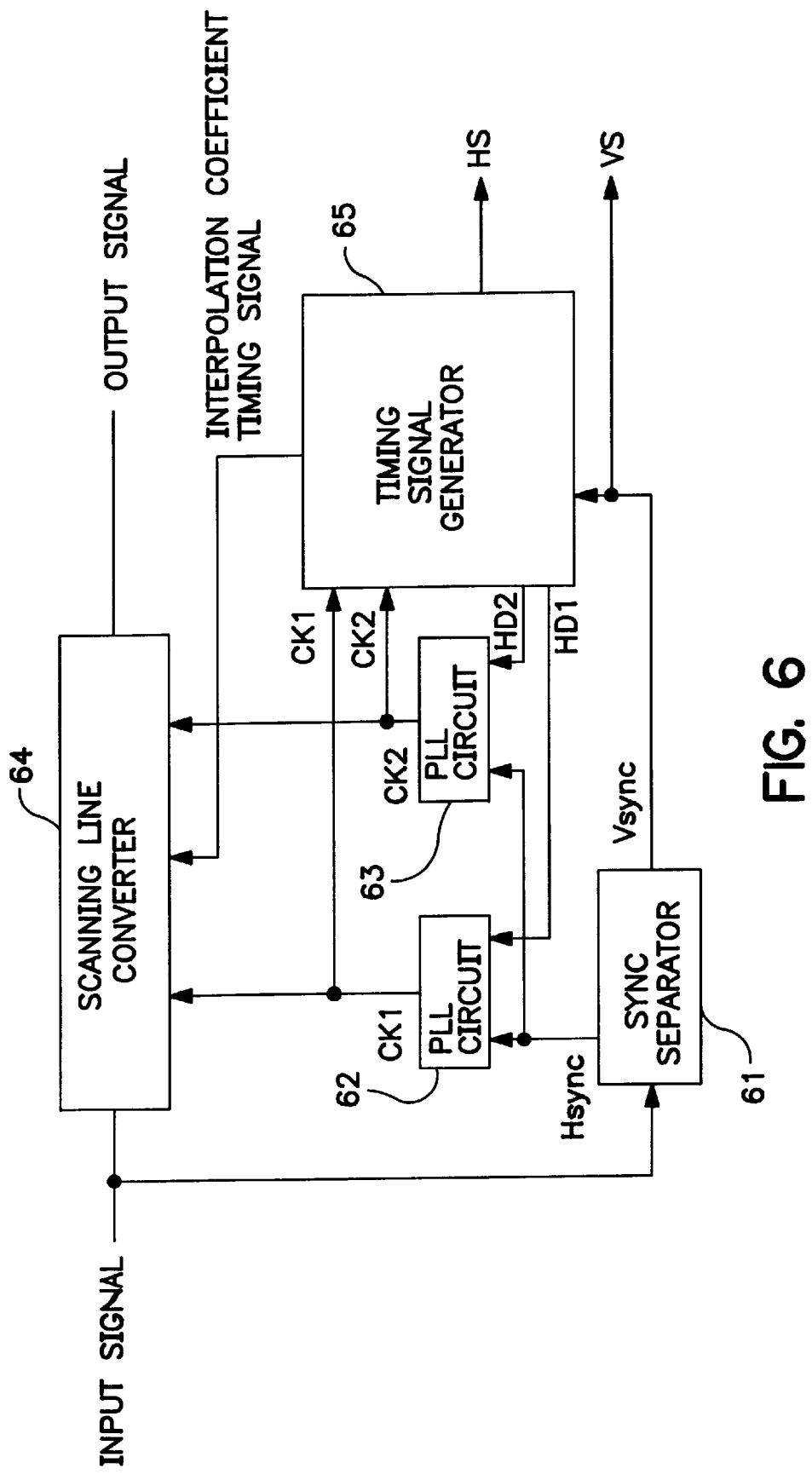
FIG. 6 is a block diagram of a pixel conversion apparatus in accordance with a first exemplary embodiment of the present invention.

FIG. 6 is a pixel conversion apparatus in accordance with a first exemplary embodiment of the present invention. In FIG. 6, the block 61 is a sync separator. The block 62 is a first PLL circuit for generating a first clock signal synchronizing with a horizontal sync signal of the input signal. The block 63 is a second PLL circuit for generating a second clock signal synchronizing with a horizontal sync signal of the input signal. The block 64 is a scanning line converter for converting the number of scanning lines of the input signal. The block 65 is a timing signal generator for generating an interpolation coefficient and an interpolation timing signal to interpolate the sample at scanning line converter 64 and generating a sync signal to drive a display device such as a liquid crystal panel.

Figure 7:
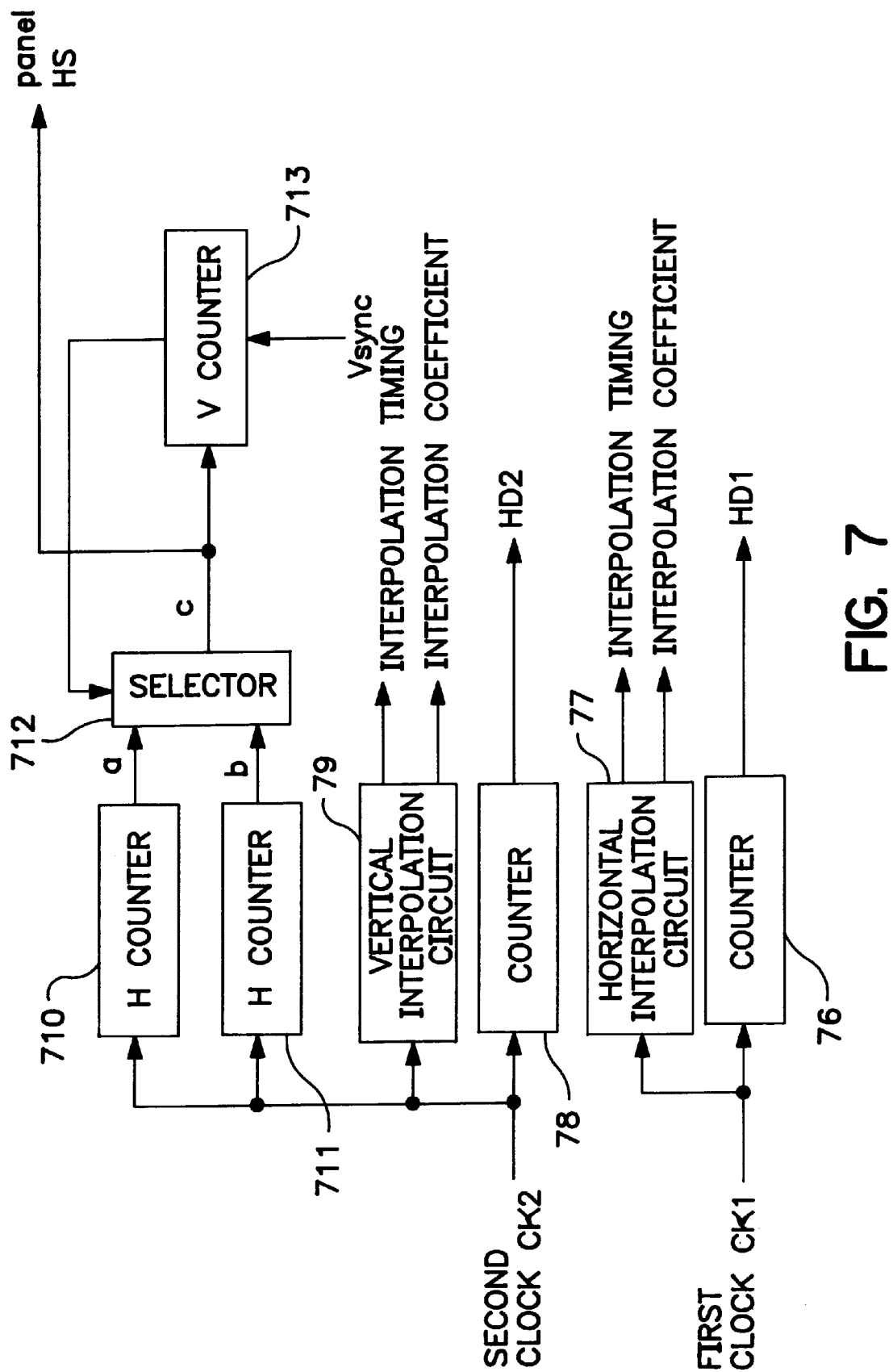
FIG. 7 is a block diagram of a timing signal generator 65 used in a pixel conversion apparatus in accordance with the first exemplary embodiment of the present invention.
Figure 8A:
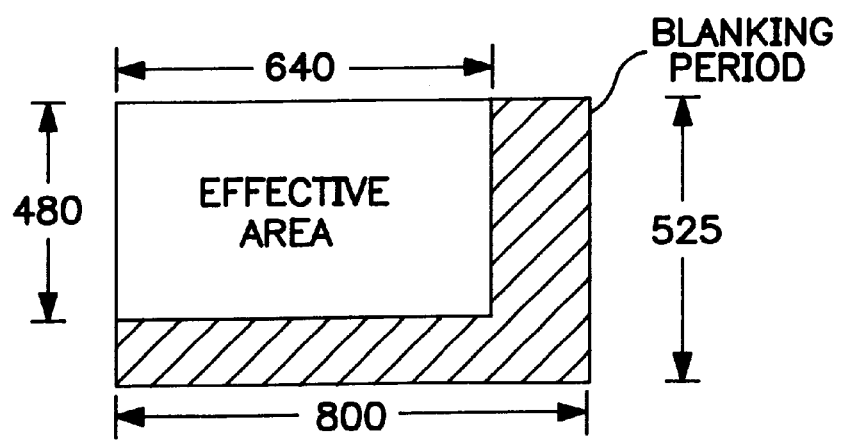
FIGS. 8(a) and 8(b) show relations between the number of samples and the number of scanning lines for three kinds of video signals in a pixel conversion apparatus in accordance with the first exemplary embodiment of the present invention.
Figure 8B:
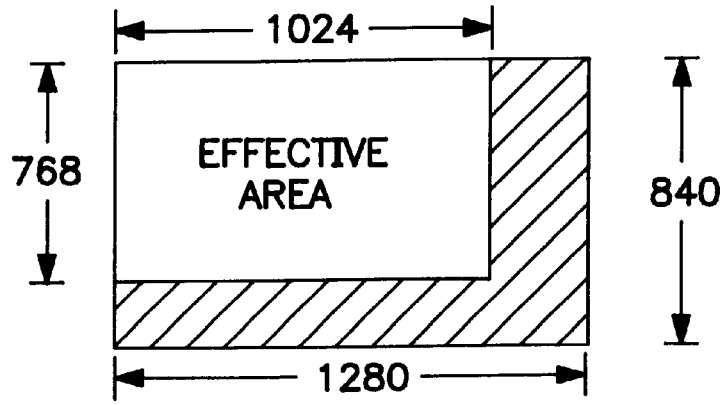
Figure 8C:
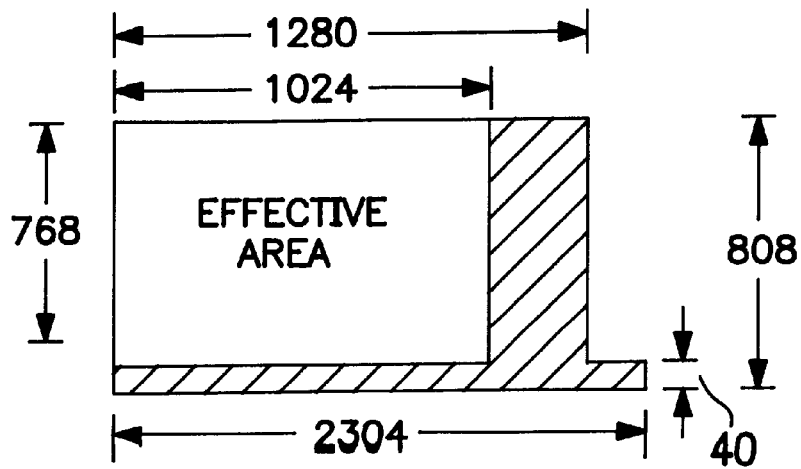
FIG. 8(c) image area of a signal 2 after conversion

FIG. 7 is an example of a block diagram of a timing signal generator. The block 76 is a first counter for generating a signal HD1 by dividing a first clock signal CK1 at an arbitrary rate. The block 77 is a horizontal interpolation circuit for generating an interpolation coefficient and a timing signal used at horizontal interpolation by using first clock signal CK1. The block 78 is a second counter for generating a signal HD2 by dividing second clock signal CK2 at an arbitrary rate. The block 79 is a vertical interpolation circuit for generating an interpolation coefficient and a timing signal used at vertical interpolation by using second clock signal CK2. The block 710 is a first H counter for generating a first horizontal sync signal a by counting second clock signal CK2. The block 711 is a second H counter for generating a second horizontal sync signal b by counting second clock signal CK2. The block 712 is a selector for selecting the output signal a of first H counter 710 or the output signal b of second H counter 711. The block 713 is a V counter for controlling selector 712 by counting a horizontal sync signal c which is an output of selector 712. FIG. 8 shows relations between the number of samples (horizontal) and the number of scanning lines (vertical) for three kinds of video signals.

The function of the pixel conversion apparatus in accordance with a first exemplary embodiment of the present invention is explained below. In FIG. 6, an input signal is applied to sync separator 61, where a horizontal sync signal Hsync and a vertical sync signal Vsync are separated and outputted. First PLL circuit 62 reproduces a first clock signal CK1 from Hsync. The frequency of first clock signal CK1 is decided at first PLL circuit 62 by setting a dividing ratio at first counter 76 in timing generator 65. For example, in the case of VGA standard, a dot clock signal at the signal sending side can be reproduced by setting the dividing ratio 800. A clock signal CK2 set at second counter 78 is similarly generated at second PLL circuit 63. For example, in the case of converting a VGA standard signal which is an input signal, the dividing ratio of second counter 78 is set to 1280 similarly to XGA standard.

Horizontal interpolation circuit 77 and vertical interpolation circuit 79 generate an interpolation coefficient and a timing signal converting from a VGA standard to an XGA standard and scanning line converter 64 converts the number of scanning lines. The input signal is converted from the relation between the number of samples and the number of scanning lines of CK1 shown in FIG. 8(a) to the relation between the number of samples and the number of scanning lines of CK2 shown in FIG. 8(b). That is, because the number of horizontal dots is converted from 800 dots to 1280 dots (1.6 times), the number of scanning lines in a vertical direction is also converted from 525 lines to 840 lines, that is 1.6 times. However, because the number of scanning lines of a standard XGA signal is 806 lines, there is no room in the timing specifications for a picture display device such as a liquid crystal panel and some parts are not displayed for a signal with 840 lines.

The output signal a of first H counter 710 and the output signal b of second H counter 711 are set 1280 and 2304, respectively and the number of lines is counted at V counter 713 and the output signal a or b is selected at the border of 768 lines. The sync signals are selected so that the timing of the horizontal sync of the effective lines is left as it is and the horizontal sync of the effective lines during a vertical blanking period is that shown in FIG. 8(c) and the number of horizontal dots for 40 (=808−768) lines during a vertical blanking period is 2304 dots.

Thus, because the number of vertical lines becomes 808 lines and it is close to 806 lines of XGA standard, the image can be displayed on the liquid crystal panel. Although an example having two H counters was shown in the first exemplary embodiment of the present invention, a timing of the horizontal sync signal is selected by using more than two H counters and a proper display can be obtained.

According to such a composition, it is possible to display a picture even on a display device having less room of timing without frame frequency conversion by providing with a plurality of horizontal sync signals during a frame period.

That is, the number of lines is not converted according to the ratio of the number of horizontal effective dots before conversion to the number of horizontal effective dots after conversion by selecting a horizontal sync signal having a plurality of horizontal frequencies in the same frame, the conversion ratio of a horizontal direction can be made different from that of a vertical direction. As a result, the number of scanning lines can be converted without any lack of picture on the display area.

(Second exemplary embodiment)

Figure 9:
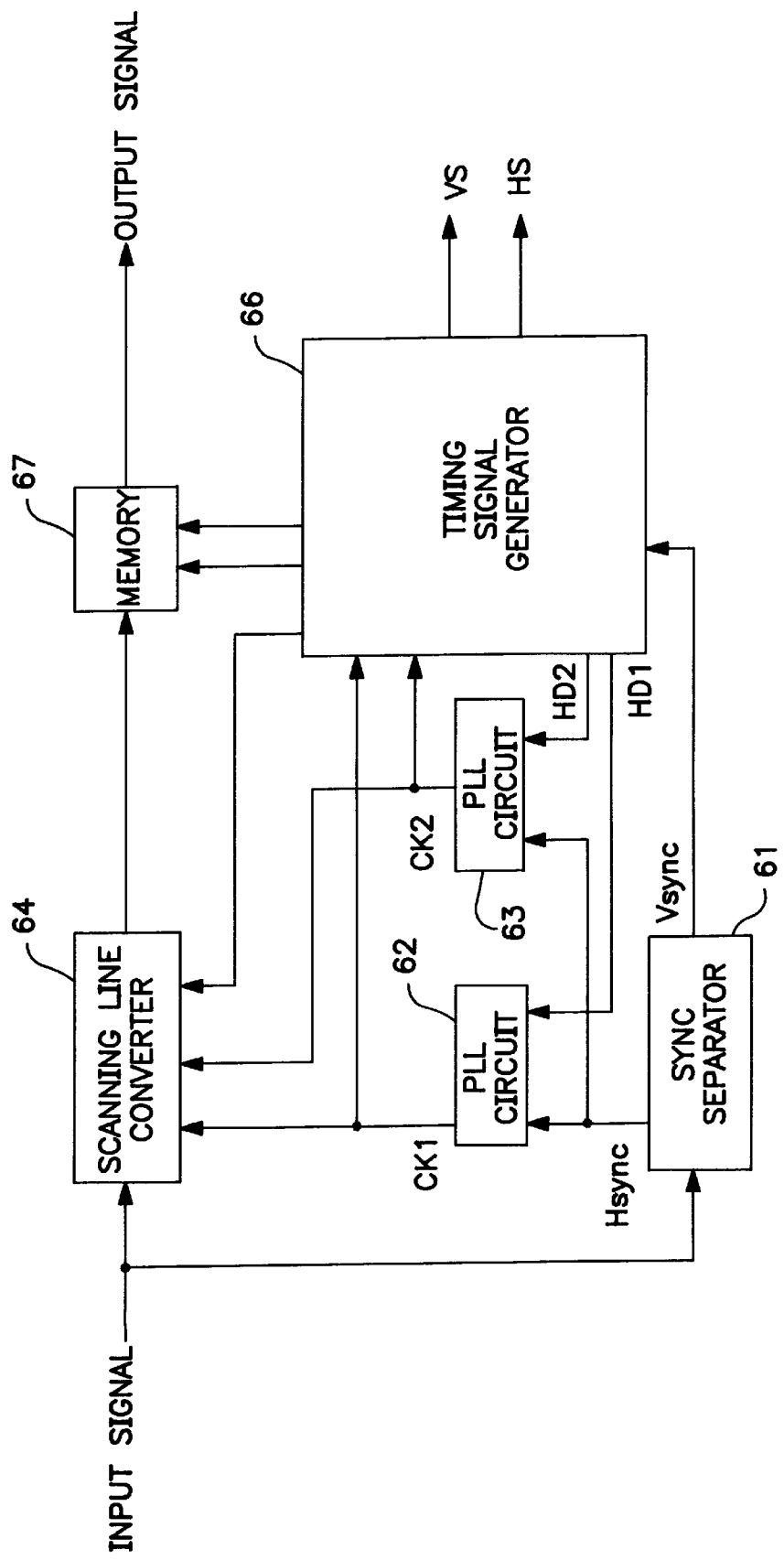
FIG. 9 is a block diagram of a pixel conversion apparatus in accordance with a second exemplary embodiment of the present invention.
Figure 10:
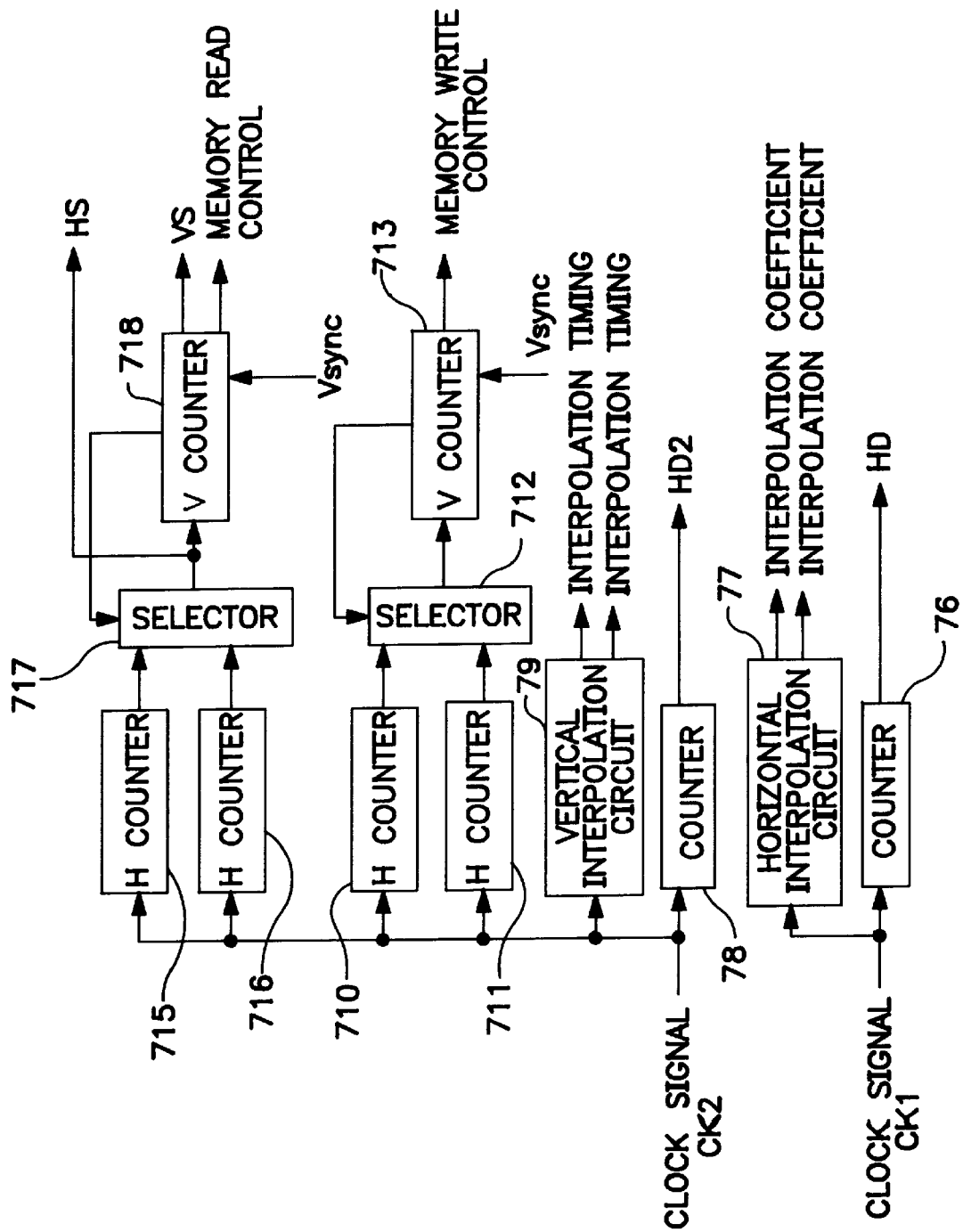
FIG. 10 is a block diagram of a timing signal generator 66 used in a pixel conversion apparatus in accordance with the second exemplary embodiment of the present invention.

A second exemplary embodiment of the present invention is explained below referring to FIGS. 9, 10, 11 and 12. The blocks having similar functions to those in the first exemplary embodiment are numbered with the same reference numbers and their explanations are omitted. In FIG. 9, the block 67 is a memory. FIG. 10 is a block diagram of a timing signal generator 66 shown in FIG. 9. The block 715 is a third H counter. The block 716 is a fourth H counter. The block 717 is a second selector. The block 718 is a second V counter. FIGS. 11 and 12 are charts expressing frame frequency conversion.

Figure 11B:
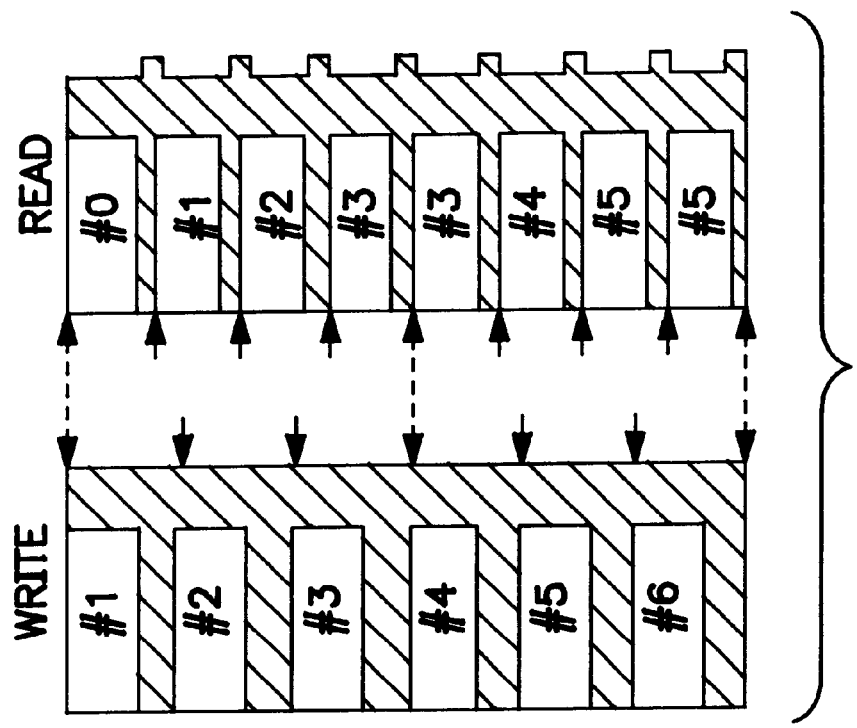
FIGS. 11(a) and 11(b) are charts explaining a function of frame frequency conversion of the present invention.
Figure 11A:
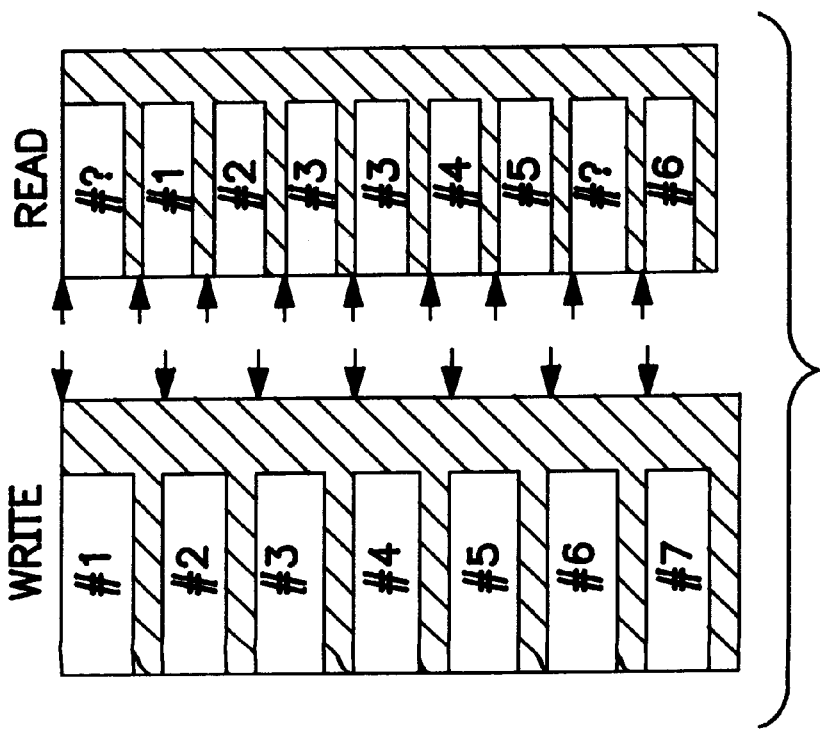

In the second exemplary embodiment, although it is general to convert a frame frequency using a memory in the case in which timing specifications of a display device is not satisfied, in this case, if the memory writing and the memory reading are made with non-synchronized clocks as shown in FIG. 11(a), a jumping over of a frame before conversion occurs on the picture. That is, when the reading clock frequency is a little higher than the writing clock frequency, the read address passes over the write address while writing like #1 (the first) frame as shown in FIG. 11(a). Although the first frame is read at reading, on the way it changes to call out a frame signal one frame ahead. It has no problem in a still picture but in a moving picture, the frame jumps over on the effective picture area and it appears as an interference.

It is possible not to make jump over in the picture by setting a clock frequency and horizontal and vertical sync frequencies after conversion so that the ratio of the number of frame clocks before conversion to the number of frame clocks after conversion is an integer as shown in FIG. 11(b). FIG. 11(b) shows an example that three frames are converted into four frames. Defining m is the total number of clocks per one frame before conversion, for example if the number of horizontal dots is 2000 and the number of scanning lines is 830, $$m = 2000 * 830 = 1660000 \text{ clocks.}$$

Where, if the number of maximum horizontal dots is 1700 and the number of maximum scanning lines is 832 as timing specifications of a liquid crystal panel, the number of maximum allowable clocks per one frame of the liquid crystal panel is $$1700 * 832 = 1414400 \text{ clocks,}$$

and even how many horizontal sync signals are given in one frame as shown in the first exemplary embodiment, the specifications for a liquid crystal panel can not be satisfied. Accordingly, only the effective picture area of the signal before conversion is written in a memory and as for reading, only the effective picture area is read out and the frame frequency is converted. Defining the total number of clocks per one frame after conversion as n, n is selected so that the ratio of n to m is an integer. For example, the three frames before conversion and the four frames after conversion are made to be equal in time. That is, $$3*m = 4*n$$

Therefore, $$n = 3/4*m = 1,245,000 \text{ clocks}$$

It satisfies the number of maximum allowable clocks of the liquid crystal panel. Then, the number of horizontal dots and the number of scanning lines after conversion are decided. The number of horizontal dots and the number of scanning lines as shown in the first exemplary embodiment can be easily decided by having a plurality of horizontal sync signals per one frame. For example, it is decided that the number of horizontal dots is 1558 for first 795 scanning lines of total 797 scanning lines and the number of horizontal dots is 1637 for the last two scanning lines. The specifications of the liquid crystal panel is satisfied.

Figure 12B:
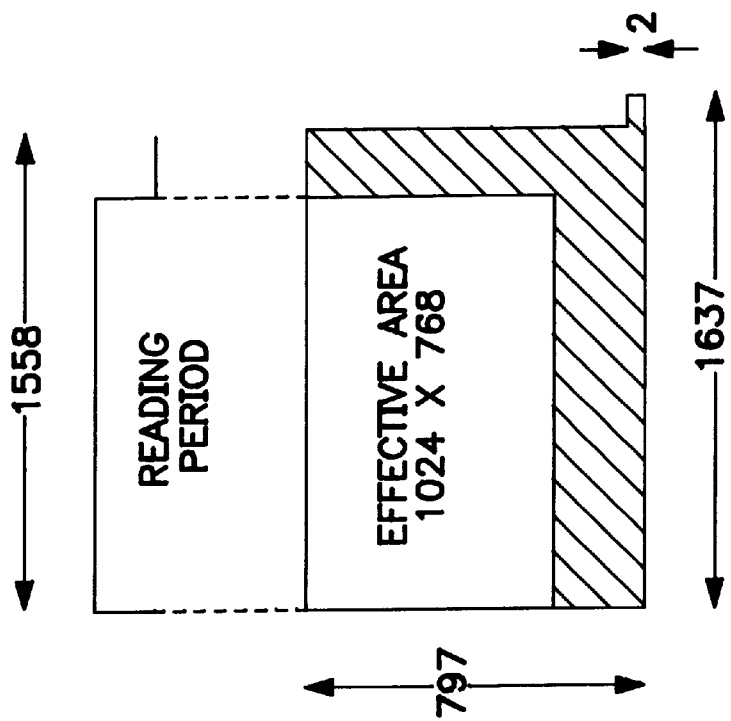
FIGS. 12(a) and 12(b) are charts explaining a function of frame frequency conversion of the present invention.
Figure 12A:
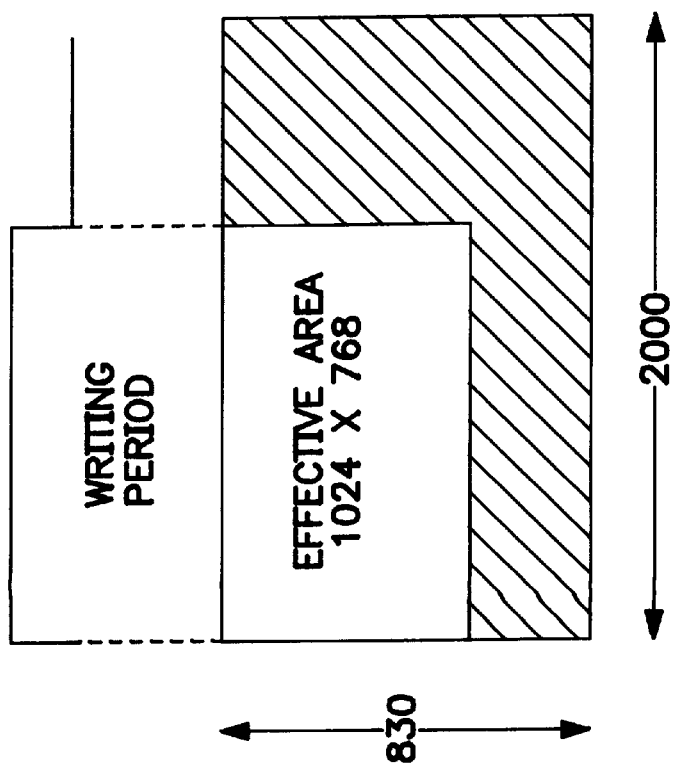

As for memory reading, only the effective picture area is read according to the number of dots decided like the above. The relations between the number of horizontal dots and the number of scanning lines before and after conversion and the relation of memory controls are shown in FIGS. 12(a) and 12(b), respectively.

In this case, a frame frequency conversion is done but neither write address nor read address does not jump over by making the writing clock the same as the reading clock. By that, interference due to a frame jumping over in the effective picture area does not occur. Because the clocks for memory writing and memory reading can be the same, the number of clock reproducing circuits can be less compared with the case of non-synchronization.

The number of total clocks before conversion m is decided by H counter 710 or 711 and V counter 713 and the number of total clocks after conversion n is decided by H counter 715 or 716 and V counter 718.

Thus, in the second exemplary embodiment of the present invention, a scanning line conversion is done without frame jumping over or discontinuous displaying.

(Third exemplary embodiment)

Figure 15C:
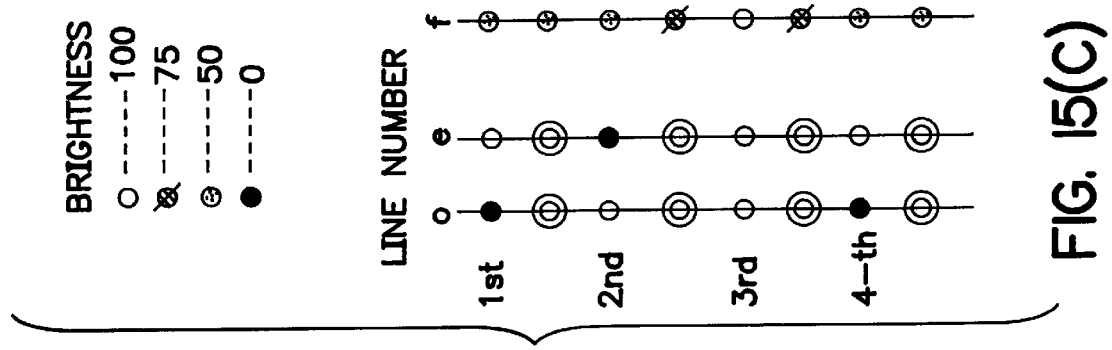
FIGS. 15(a)–15(c) are charts explaining a vertical interpolation of a pixel conversion apparatus in accordance with the third exemplary embodiment of the present invention.
Figure 15B:
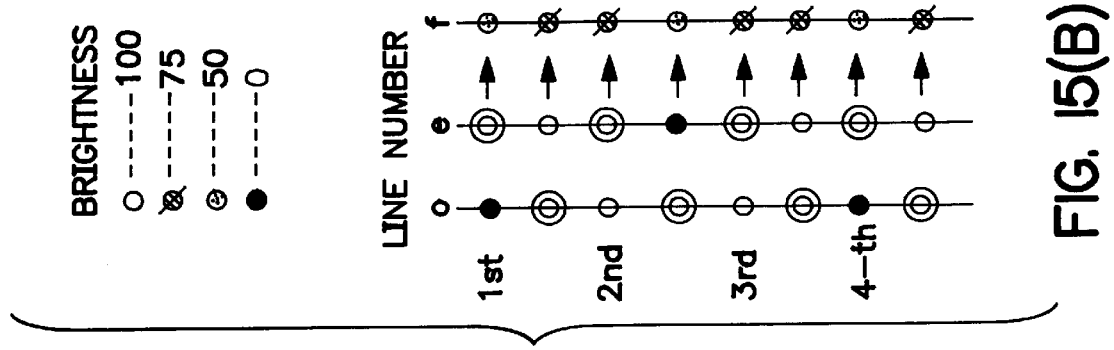
Figure 15A:
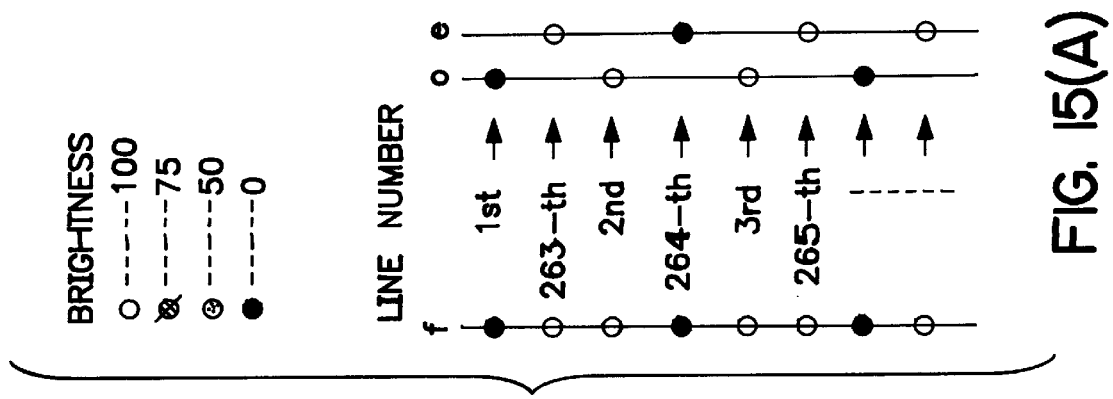
Figure 16:
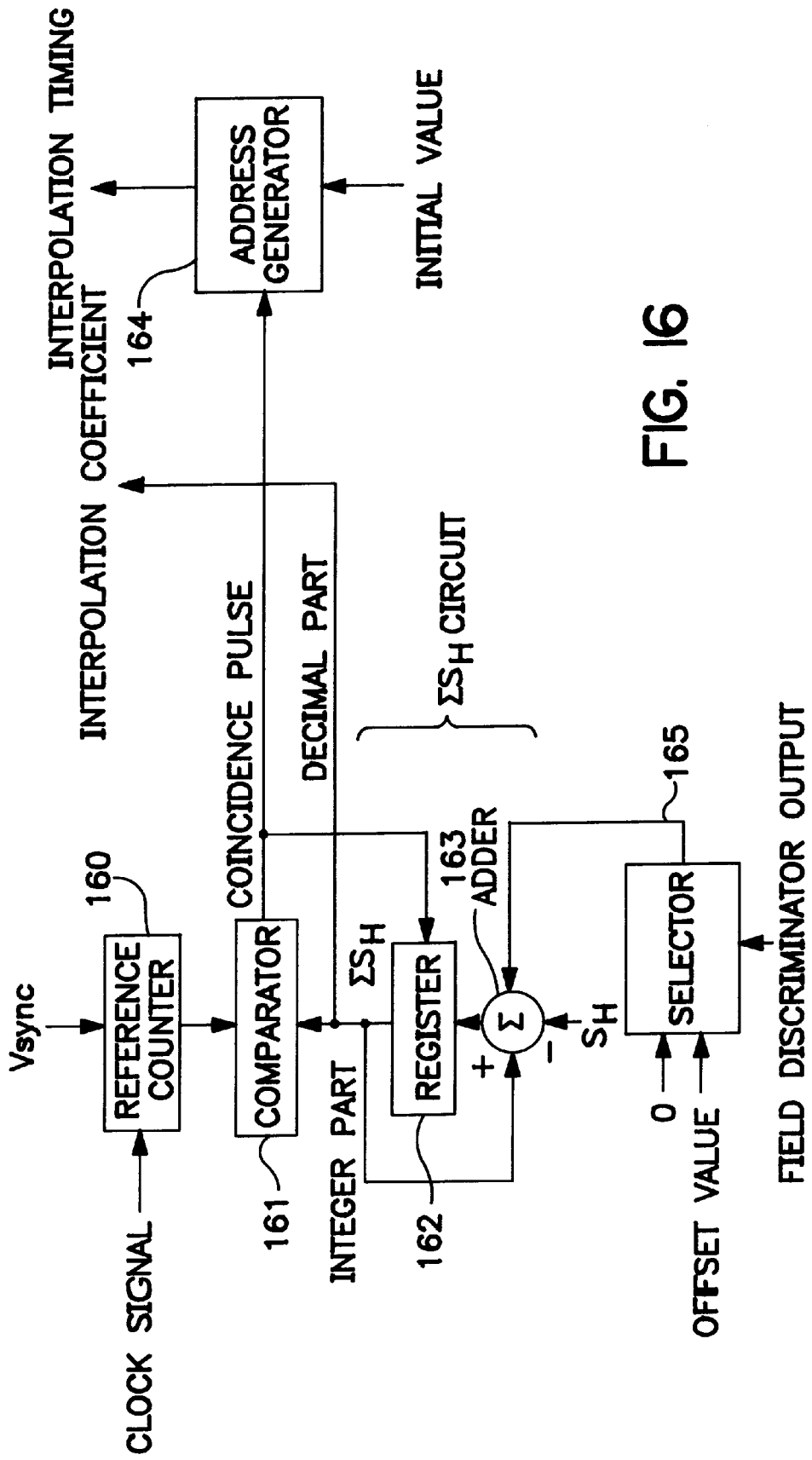
FIG. 16 is a block diagram of a timing signal generator 137 used in a pixel conversion apparatus in accordance with the third exemplary embodiment of the present invention.

A third exemplary embodiment of the present invention is explained below referring to FIGS. 13, 14(a), 14(b), 15(a), 15(b), 15(c) and 16. The block 131 is a sync separator. The block 132 is a field discriminator. The block 133 is a scanning line converter. The block 134 is a first delay device for delaying the output of scanning line converter 133 by one horizontal period. The block 135 is a second delay device for delaying the output of delay device 134 by one horizontal period. The block 136 is a sync signal generator. The block 137 is a timing signal generator. The block 138 is an interpolation circuit. FIGS. 14(a)–14(d) are charts explaining a functional principle of a vertical interpolation. FIGS. 15(a)–15(c) are charts showing a vertical interpolation for an interlaced signal. FIG. 16 is a block diagram of a timing signal generator 137. The block 165 shown in FIG. 16 is a selector.

Figure 13:
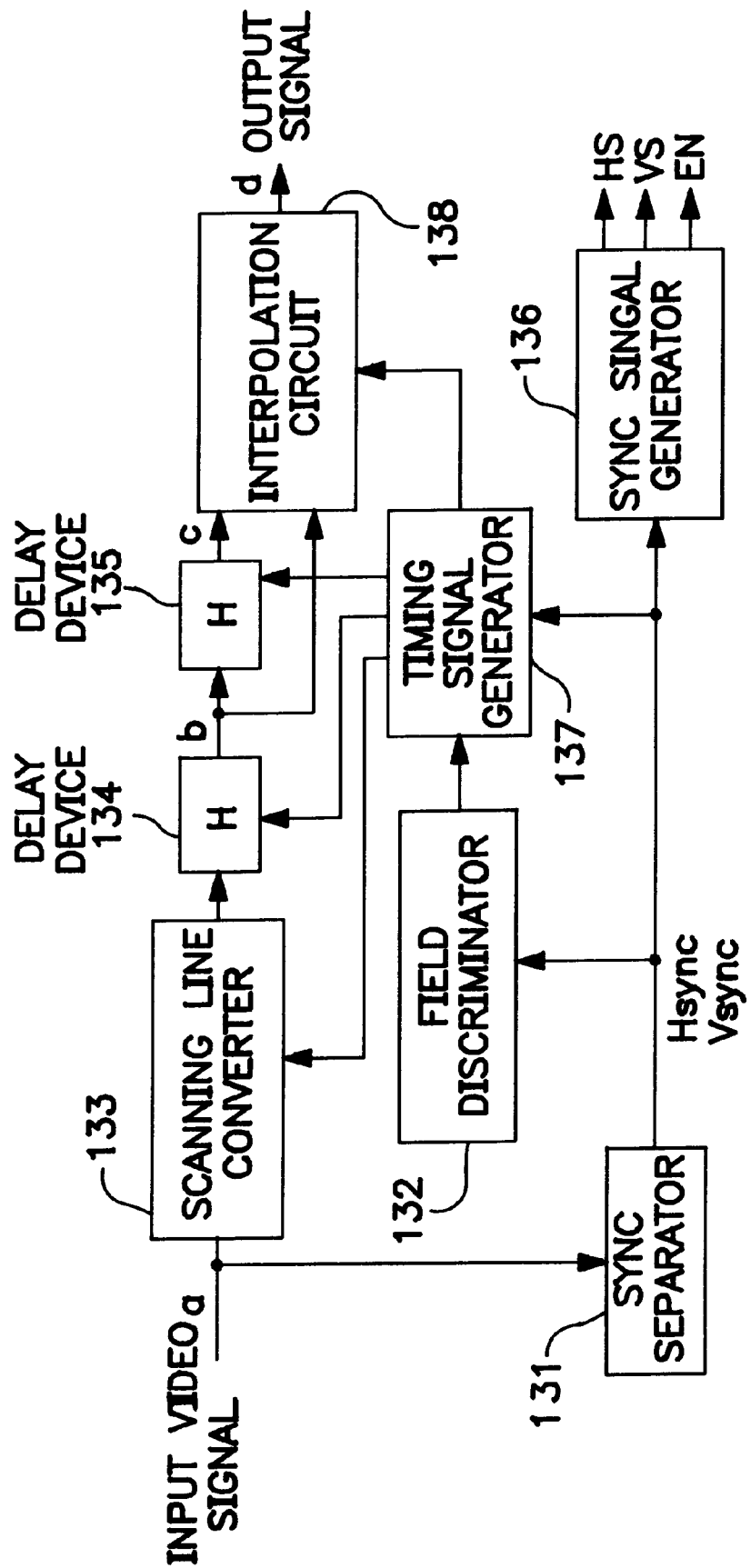
FIG. 13 is a block diagram of a pixel conversion apparatus in accordance with a third exemplary embodiment of the present invention.
Figure 14A:
FIGS. 14(a)–14(d) are charts explaining a functional principle of a pixel conversion apparatus in accordance with the third exemplary embodiment of the present invention.
Figure 14B:
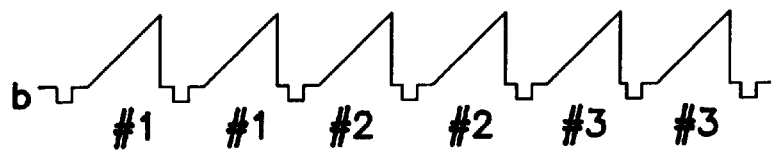
Figure 14C:
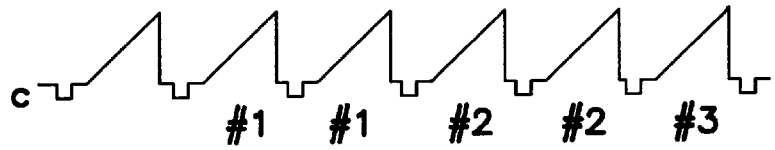
Figure 14D:
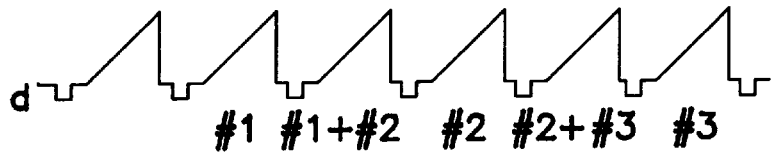

In FIG. 13, an video signal is supplied to sync separator 131, where a horizontal sync signal (Hsync) and a vertical sync signal (Vsync) are separated and outputted. Field discriminator 132 discriminates which the present field is an even field or an odd field from the separated sync signals by checking, for example the phase relation between Hsync and Vsync.

At sync signal generator 136, sync signals after scanning line conversion necessary for driving the liquid crystal panel module such as a horizontal sync signal (HS), a vertical sync signal (VS), an enable signal (EN), etc. are generated from the inputted Hsync and Vsync. Sync signal generator 136 reproduces a dot clock by a PLL circuit from Hsync, divides the dot clock at a counter and outputs HS, VS, EN, etc.

Scanning line converter 133 converts the horizontal frequency of the input video signal and outputs. At scanning line converter 133, the number of scanning lines in a horizontal period (FIG. 14(a)) is converted similarly to the reduction described in the example of the prior art. The signal which frequency was converted is outputted through delay devices 134 and 135. The waveforms at the input and the outputs of the delay devices and the interpolation circuit are shown in FIGS. 14(a)–14(d). The signals outputted from delay devices 134 (FIG. 14(b)) and 135 (FIG. 14(c)) are inputted into interpolation circuit 138, interpolated in a vertical direction and outputted (FIG. 14(d)). In the example of doubling the horizontal frequency shown in FIGS. 14(a)–14(d), the outputs of delay devices 134 and 135 are interpolated according to the coefficient calculated at timing signal generator 137.

But in the case that the input signal is an interlaced signal such as an NTSC signal, if the original signal at the sending side is progressive as shown in FIG. 15(a), the signal is sent separating into an odd field o and an even field e, where the white circles express high luminance (bright) signals and the black circles express low luminance (dark) signals. The outputted interlaced signal is interpolated at each of even field and odd field and displayed at the receiving side.

An example in accordance with the prior art is shown in FIG. 15(c). The scanning lines (indicated by double circle) are interpolated at each of even field and odd field, using an FIFO and without using a field memory for a signal after conversion (non-interlaced). A line is interpolated between the first and the second scanning lines of an odd field o. To convert the number of scanning lines into double , the interpolation coefficient is 0.5 and a mean value of the signals on the first and the second scanning lines is a signal of the interpolated line. In this example, because the first line has a low brightness and the second line has a high brightness, the interpolated line has a medium brightness. The even lines e are similarly interpolated and the number of scanning lines becomes double.

Generally, it is necessary to reset the Vsync at a reference counter 160 in order to be able to respond to various kinds of signals such as PAL other than NTSC by making to be able to set an any dividing ratio. Because the timing and the coefficient of the interlacing are generated as a reference of the vertical sync signal Vsync both for the odd field and for the even field, some deviation occurs at every field. Therefore, the signal combining the odd field and the even field, when watching with a liquid crystal panel, appears to have a value integrating each field from the response characteristic for viewers. This is shown in FIG. 15(c) as a signal f after conversion (non-interlace conversion) and the original signal (before conversion) varies with one low brightness signal (dot) and two high brightness signals (dots), while the converted signal varies with three low (medium) brightness signals (dots) and three high brightness signals (dots). There is no problem when the signal at the sending side is non-interlaced but the vertical resolution deteriorates as shown in FIG. 15(c) when the signal is interlaced.

In the pixel conversion apparatus in accordance with the third exemplary embodiment of the present invention, only the interpolation coefficient of even field is offset by 0.5. The interpolation coefficient is generated as 0, 0.5, 0. 0.5, . . . at reference counter 160 for the odd field, while it is generated as 0.5, 0. 0.5, 0, . . . at for the even field. The signal after interlace conversion is interpolated as shown by e in FIG. 15(b) and the viewer feels as shown by f at watching the liquid crystal panel. A brightness variation with two high (medium) brightness signals and one low (medium) brightness signal is obtained and it is similar to that of the original signal.

The brightness level of the signal is expressed by the darkness of the circle in FIGS. 15(a)–15(c) (from the white circle, highest brightness to the black, lowest brightness).

FIG. 16 shows a block diagram of a timing signal generator 137. The offset of adder 163 in ZSH circuit is selected at selector 165 according to the field discrimination result. When the signal is an odd field, selector 165 selects zero and when it is an even field, selector 165 selects the offset value. The offset value is a value multiplying SH (a reciprocal of reduction factor) by 0.5.

According to the third exemplary embodiment of the present invention, the interpolation coefficients for even and odd fields are offset and a signal as if it were interlaced is obtained after interpolation. The deterioration of a vertical resolution can be prevented by varying the vertical interpolation coefficient for interpolating signals at each of the odd field and the even field.

(Fourth exemplary embodiment)

Figure 17:
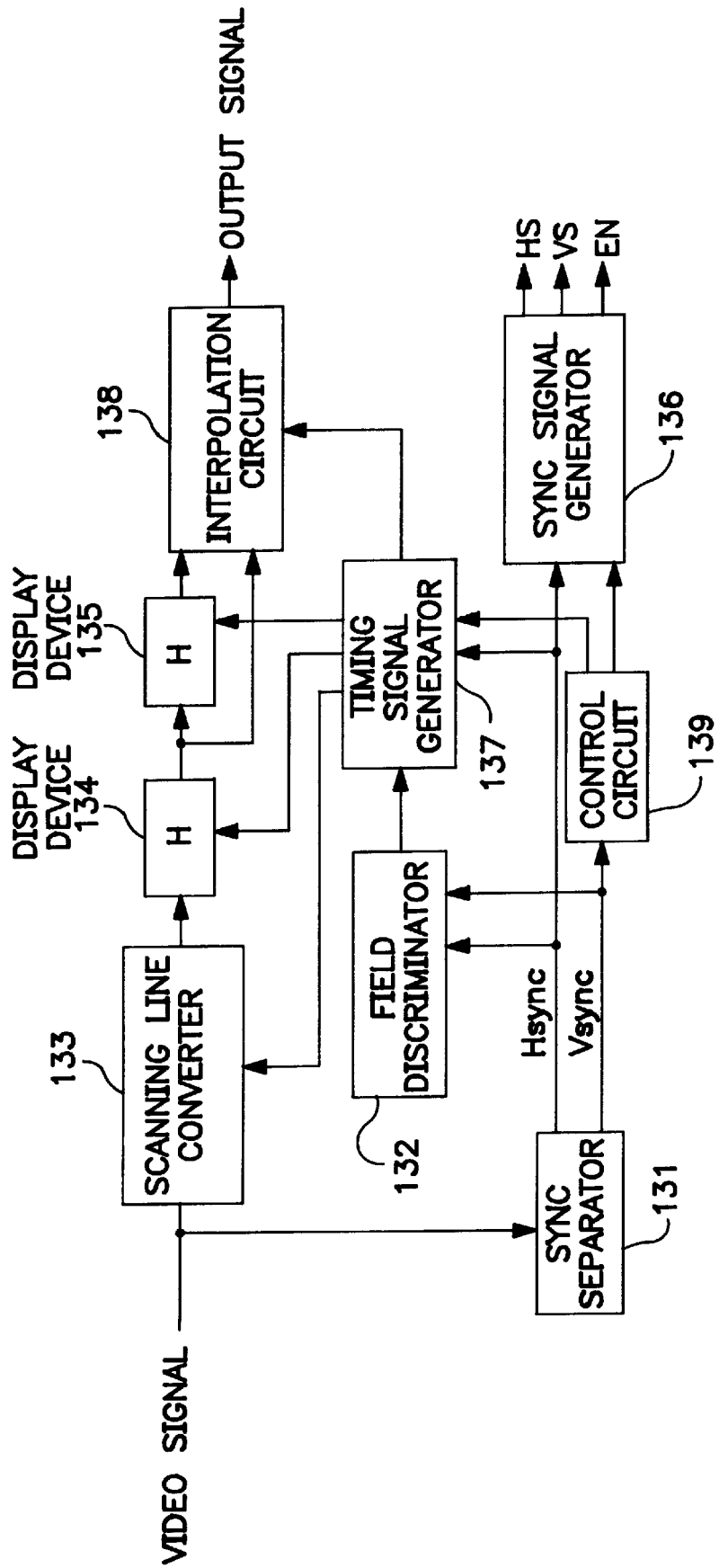
FIG. 17 is a block diagram of a pixel conversion apparatus in accordance with a fourth exemplary embodiment of the present invention.
Figure 18:
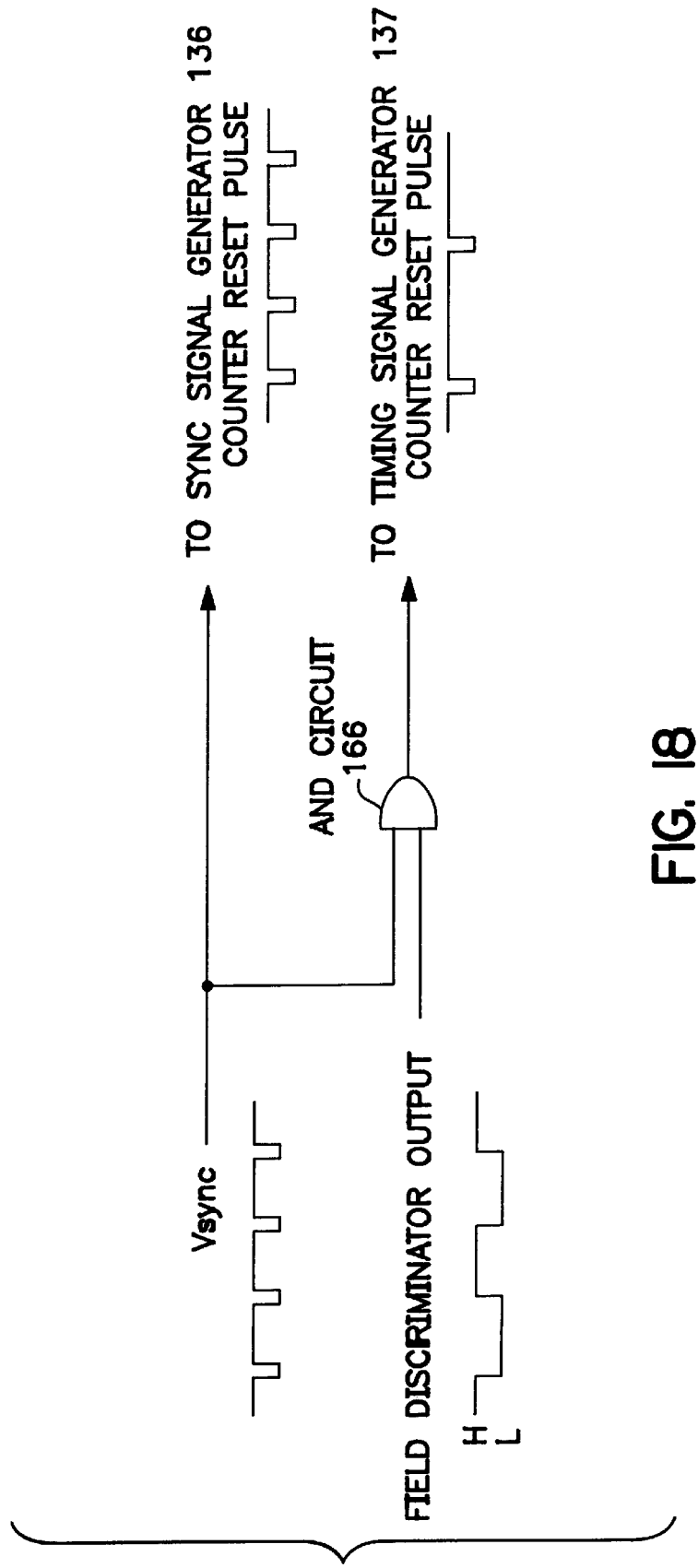
FIG. 18 is a block diagram of control means of a pixel conversion apparatus in accordance with the fourth exemplary embodiment of the present invention.

A fourth exemplary embodiment of the present invention is explained below referring to FIGS. 17 and 18. The blocks having similar functions to those in the exemplary embodiment previously described are numbered with the same reference numbers and their explanations are omitted. In FIG. 17, the block 139 is a control circuit for controlling a sync signal generator 136 and a timing signal generator 137 according to the vertical sync signal Vsync from sync separator 131. FIG. 18 is a block diagram of a control circuit. The block 166 is an AND circuit. Although every odd field and every even field are reset by Vsync and the interpolation coefficient is odd set by 0.5 in the third exemplary embodiment, timing signal generator 137 is reset not at every field but at every frame in the fourth exemplary embodiment. Because the resetting is made at every frame, the interpolation finishes in one frame and it is the same interpolation as that the offset is given to the interpolation coefficient, resetting at every field. In this case, sync signal generator 136 generates HS, VS and EN similarly to that of the third exemplary embodiment.

According to a pixel conversion apparatus in accordance with the fourth exemplary embodiment, every pulse to drive the liquid crystal panel synchronizes with the input signal even if the input sync is not normal like when an non-standard signal is inputted, a stable picture can be obtained and the deterioration in vertical resolution can be prevented similarly to the third exemplary embodiment.

(Fifth exemplary embodiment)

Figure 19:
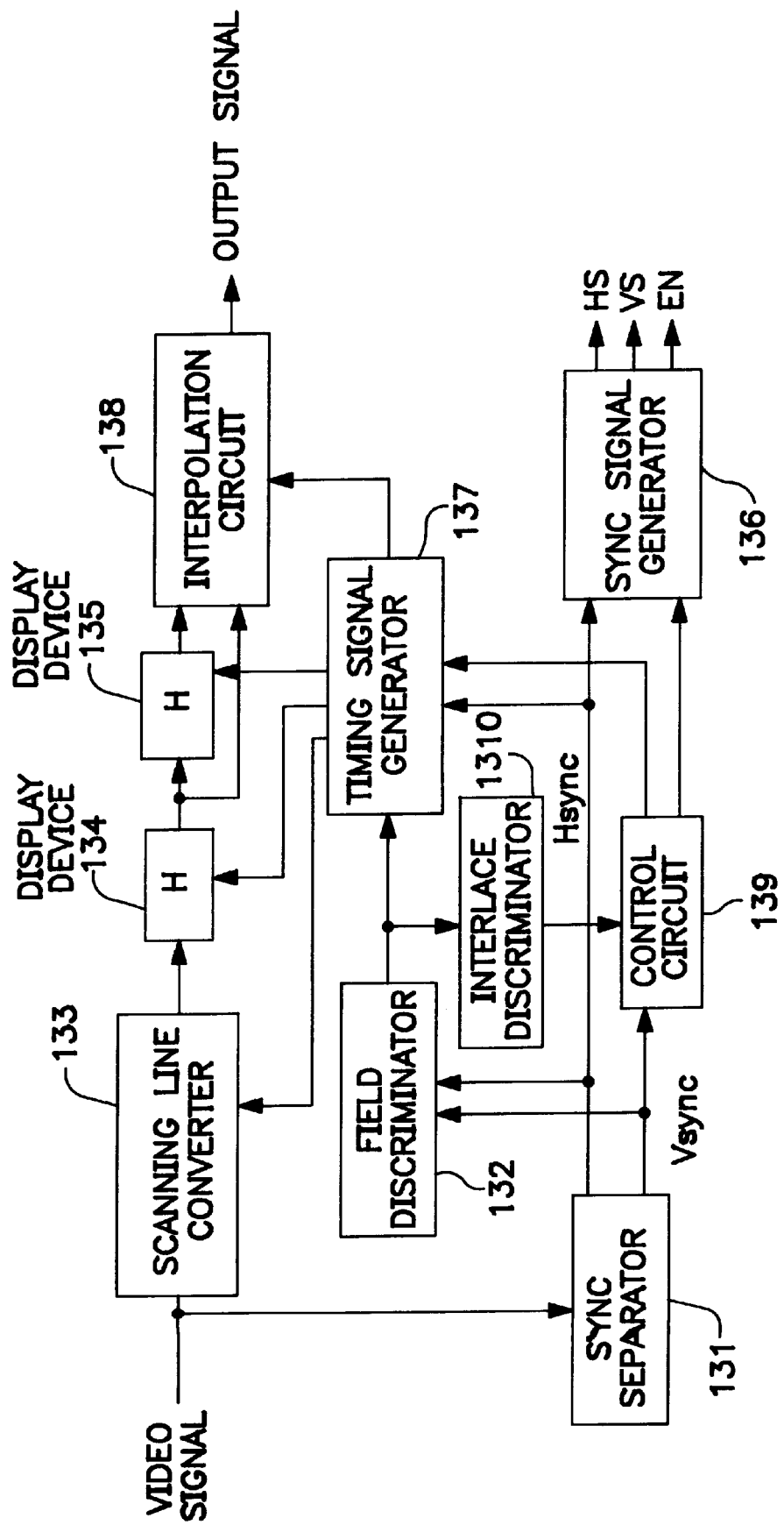
FIG. 19 is a block diagram of a pixel conversion apparatus in accordance with a fifth exemplary embodiment of the present invention.
Figure 20:
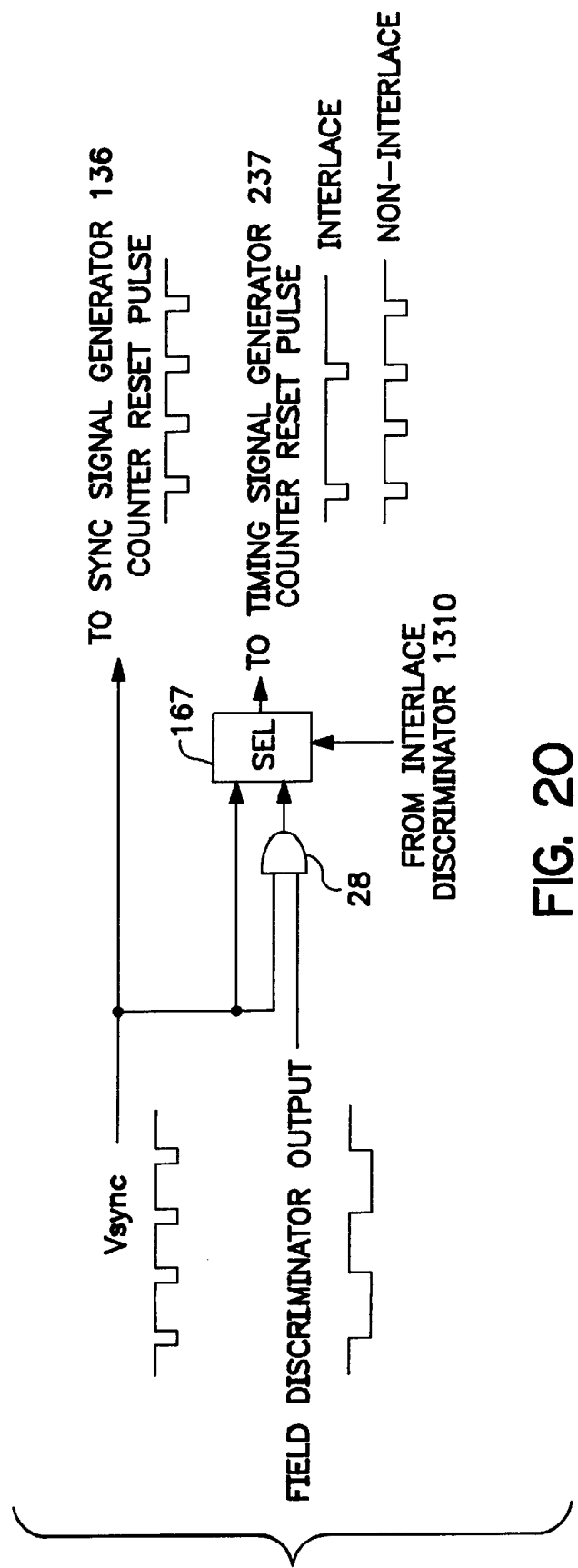
FIG. 20 is a block diagram of control means of a pixel conversion apparatus in accordance with the fifth exemplary embodiment of the present invention.

A fifth exemplary embodiment of the present invention is explained below referring to FIGS. 19 and 20. The blocks having similar functions to those in the exemplary embodiment previously described are numbered with the same reference numbers and their explanations are omitted. In FIG. 19, the block 1310 is an interlace discrimination circuit for discriminating which the input signal is interlace or non-interlace. FIG. 20 is a block diagram of a control circuit 139. In FIG. 20, the block 167 is a selector. Interlace discrimination circuit 1310 alternately discriminates which the field is an odd field or an even field when the input signal is interlaced but always judges to be an odd field when the input signal is non-interlaced. Which the signal is interlace or non-interlace can be discriminated by monitoring the output of interlace discrimination circuit 1310 over a plurality of fields.

In the case in which the input signal is an interlaced, selector 167 selects the output of AND circuit 166 so that timing signal generator 137 is reset at every frame, similarly to the fourth exemplary embodiment. In the case in which the input signal is a non-interlaced such as in a game machine, selector 167 selects Vsync so as to reset at every field. By such a composition, optimum vertical interpolation can be made according to the input signal.

(Sixth exemplary embodiment)

Figure 21:
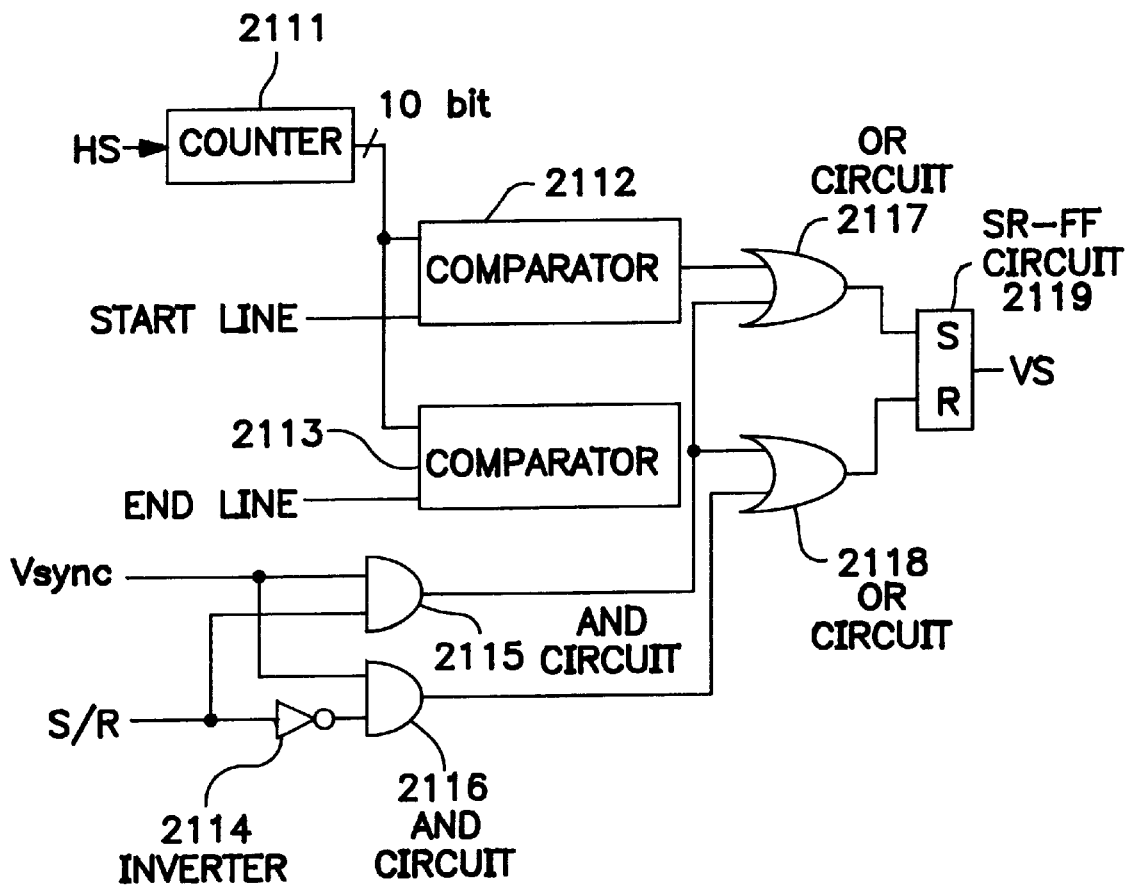
FIG. 21 is a block diagram of a sync signal generation circuit of a pixel conversion apparatus in accordance with a sixth exemplary embodiment of the present invention.

A sixth exemplary embodiment of the present invention is explained below referring to FIG. 21. FIG. 21 is a block diagram of a sync signal generator 136. The block 2111 is a counter. The block 2112 is a first comparator. The block 2113 is a second comparator. The block 2114 is an inverter. The block 2115 is a first AND circuit. The block 2116 is a second AND circuit. The block 2117 is a first OR circuit. The block 2118 is a second OR circuit. The block 2119 is an RS-FF (reset-set flip-flop) circuit.

The sync signal generator shown in FIG. 21 is an example to generate a vertical sync signal VS. Counter 2111 counts the number of horizontal sync signals HS in the inputted signal HS. The counted numerical value (10 bits) is compared with the start line value and the end line value set at comparators 2112 and 2113, respectively and are outputted as coincidence signals. Receiving the coincidence signals, RS-FF 2119 outputs a vertical sync signal VS.

For example, in the case in which the start line is 10 and the end line is 30, from the line 10 to the line 30 output an H (high) level pulse. In this case, OR circuits 2117 and 2118 forcibly set or reset during Vsync period (in this case, positive polarity).

Set or reset is selected at inverter 2114 and AND circuits 2115 and 2116. That is, if the output of SR-FF 2119 is "H" (high) level, set is selected. When the input signal is a non-standard NTSC signal (for example, the number of lines is 260 lines per field), the number of scanning lines is 520 after converting into double.

In the case in which vertical sync signal VS applied to the liquid crystal panel is a standard signal, when the horizontal sync signal HS is set in the 30 lines from 495-th to 525-th line, and if OR circuits 2117 and 2118 forming a forced RS circuit do not exsist, the counted value of counter 2111 is only a value from 1 to 520 and can not be the value 525, the last scanning line. Therefore, vertical sync signal VS is always in a set state and in the case of a non-synchronous signal, in the above example, if the circuit is forcibly reset according to input vertical sync signal Vsync, a pulse width of VS at 495-th to 520-th line can be generated. In the above example, although the case of vertical sync signal VS is described, it is the same in all other pulses.

According to such a composition, various kinds of stable pulses can be generated even in the case of non-standard input video signal and optimum vertical interpolation can be obtained.

Thus, according to a pixel conversion apparatus in accordance with the sixth exemplary embodiment of the present invention including: a sync separator for separating a horizontal sync signal and a vertical sync signal from a n input video signal; a field discriminator for discriminating a field of the input video signal; a scanning line converter for converting the number of scanning lines of the input video signal; a first delay device for delaying the output of the scanning line converter by one horizontal period; a second delay device for delaying the output of the first delay device by one horizontal period; a sync signal generator for generating horizontal and vertical sync signals after scanning line conversion from the output of the sync separator; an interlace discriminator for discriminating which the input video signal is interlaced or non-interlaced; a timing signal generator for generating pulses and a vertical interpolation coefficient to use for scanning line conversion, linking with the timing signal generator and the interlace discriminator; an interpolation circuit for interpolating a signal from the outputs of the first and second delay devices according to the output of the timing signal generator; a control circuit for controlling reset signals of the sync signal generator and the timing signal generator according to the kind of the input video signal and can forcibly initialize various kinds of output pulses of the sync signal generator and the timing signal generator, synchronizing with the vertical sync signal of the input video signal.

(Seventh exemplary embodiment)

Figure 22:
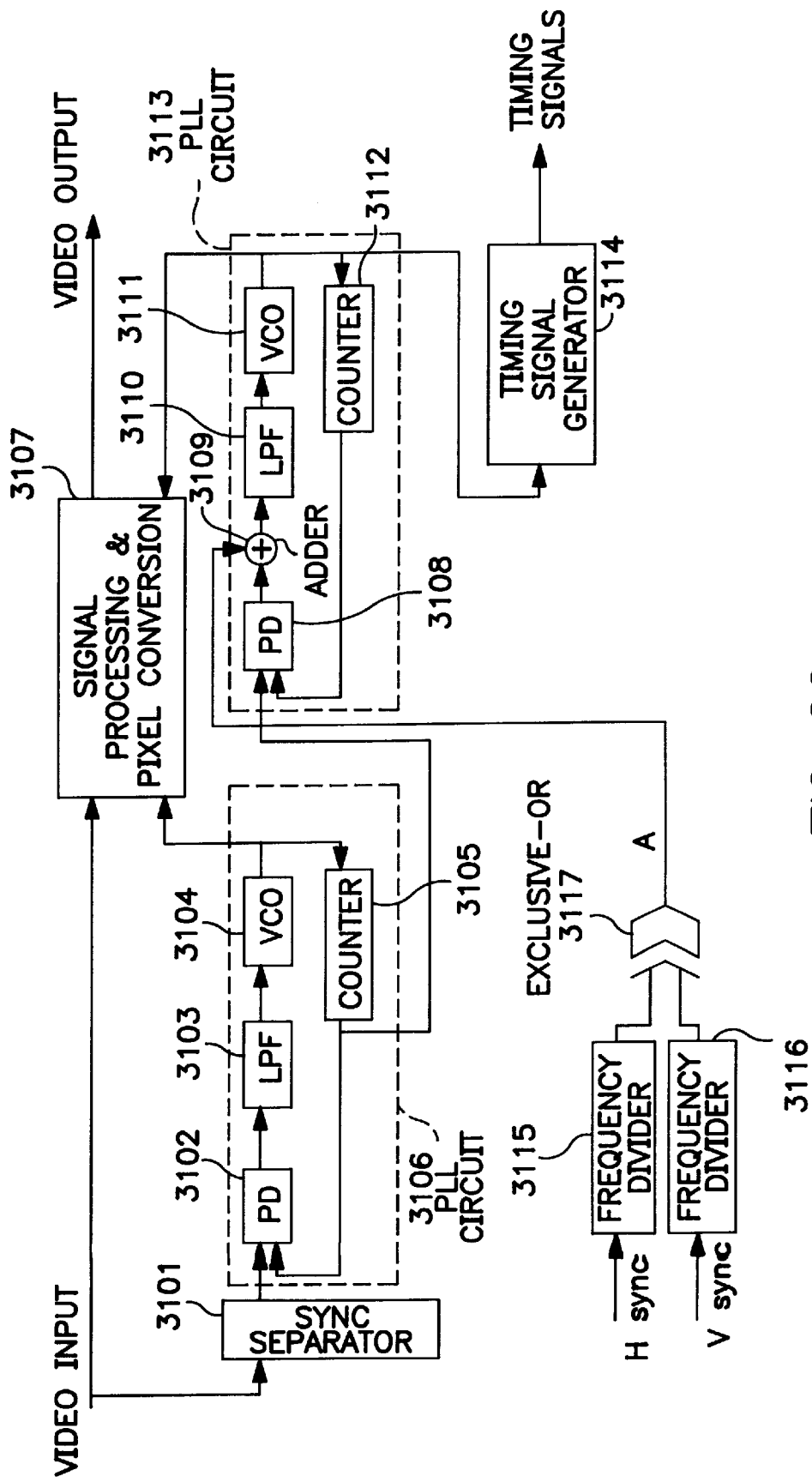
FIG. 22 is a block diagram of a picture display apparatus in accordance with a seventh exemplary embodiment of the present invention.

FIG. 22 is a block diagram of a picture display apparatus in accordance with a seventh exemplary embodiment of the present invention. The block 3101 is a sync separator. The block 3102 is a first phase detector. The block 3103 is a first LPF. The block 3104 is a first VCO. The block 3105 is a first counter. The block 3106 is a first PLL including first phase detector 3102, LPF 3103, VCO 3104 and first counter 3105. The block 3107 is a pixel converter. The block 3108 is a second phase detector. The block 3109 is an adder. The block 3110 is a second LPF. The block 3111 is a second VCO. The block 3112 is a second counter. The block 3113 is a second PLL including second phase detector 3108, adder 3109, second LPF 3110, second VCO 3111 and second counter 3112.

The function of a picture display apparatus composed like the above is explained below. A composite video signal inputted from the outside is supplied to pixel converter 3107 and processed of expansion or reduction by the clock signals from first PLL 3106 and second PLL 3113. (Different clock frequencies are used at the input and the output.)

The composite video signal inputted from the outside is supplied to sync separator 3101 at the same time. Sync separator 3101 extracts only sync signals from the input composite video signal. The horizontal sync signal separated at sync separator 3101 is supplied to first phase detector 3102. The output of VCO 3104 is used as a clock for the front stage of the pixel converter. First counter 3105 divides the frequency at arbitrary rate and the divided signal is supplied to first phase detector 3102. The output of first counter 3105 is supplied to second phase detector 3108. The output of second phase detector 3108 is supplied to one of the input terminals of adder 3109 and is frequency divided at an arbitrary rate. The output of second counter 3112 is supplied to the other input terminal of second phase detector 3108.

The vertical and horizontal sync signals separated at sync separator 3101 are inputted to a first frequency divider 3115 and a second frequency divider 3116 and divided in 2. An exclusive-OR is calculated from the outputs of first frequency divider 3115 and second frequency divider 3116 at an exclusive-OR gate 3117. The output terminal of exclusive-OR gate 3117 is connected to the other input terminal of adder 3109. That is, a specific voltage is added to a voltage for controlling VCO 3111 in second PLL circuit 3113 generating a clock for the rear stage at every toggle period which is an exclusive-OR of a horizontal period and a vertical period.

Thus, according to the seventh exemplary embodiment of the present invention, a picture display apparatus synchronizing with a frame frequency and having a non-synchronous clock, especially reducing beat interference and the like such as in a liquid crystal display apparatus can be presented.

(Eighth exemplary embodiment)

Figure 23:
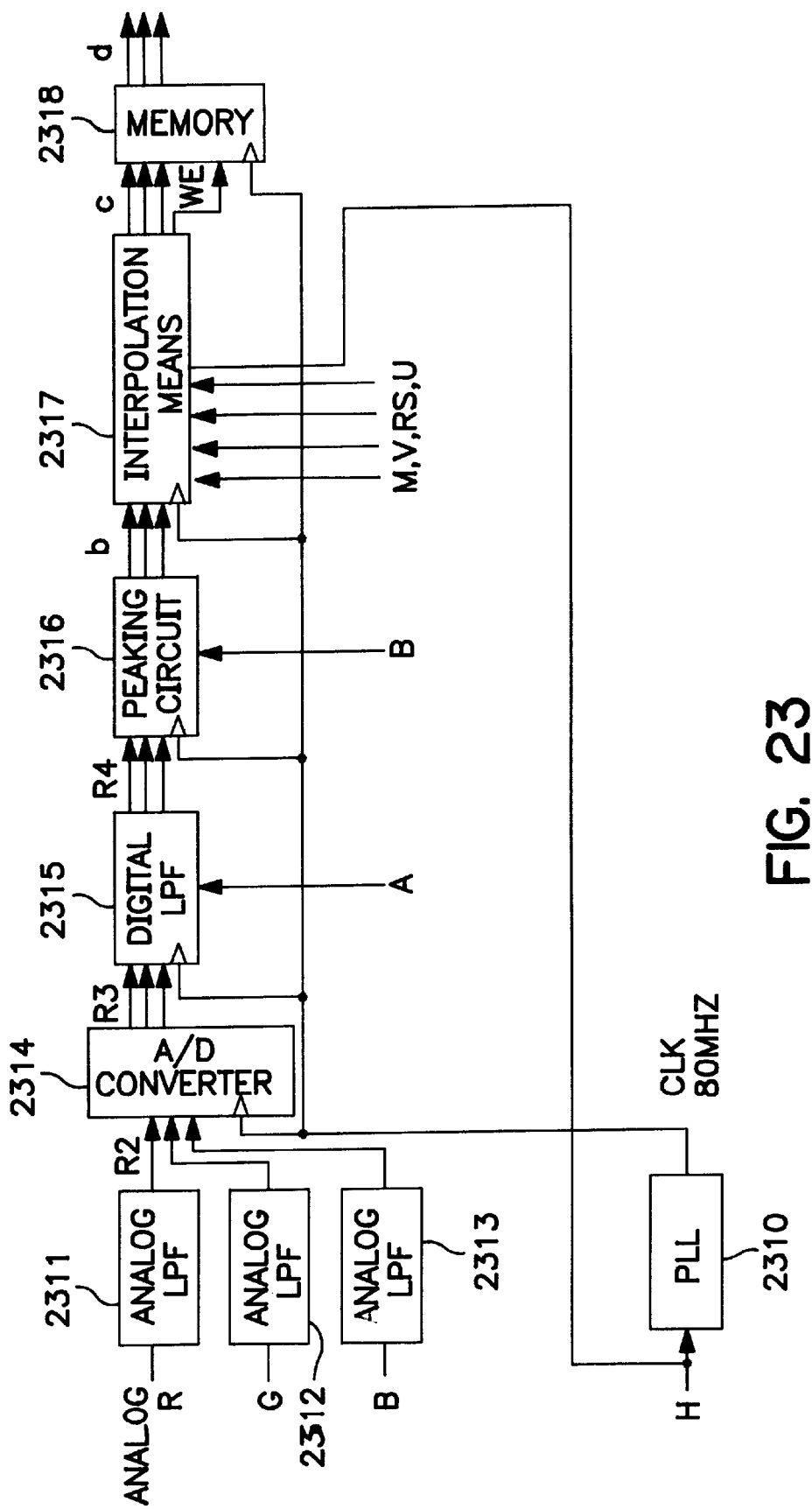
FIG. 23 is a block diagram of a horizontal pixel conversion apparatus used in a pixel conversion apparatus in accordance with an eighth exemplary embodiment of the present invention.

FIG. 23 is a block diagram of a horizontal pixel converter in accordance with an eighth exemplary embodiment of the present invention. The blocks 2311, 2312 and 2313 are LPFs composed of analog elements and limit the pass bands of the input video signals R, G and B, respectively. The block 2314 is an A/D converter for converting the band limited video signals (R2) to digital signals. The block 2310 is a PLL circuit for generating a clock signal from a horizontal sync signal H having a frequency of about 80 MHz in this example. The output signal of A/D converter 2314 is outputted passing through a digital LPF 2315 having a narrower bandwidth (R4). Signal A controls the bandwidth of digital LPF 2315.

Figure 24:
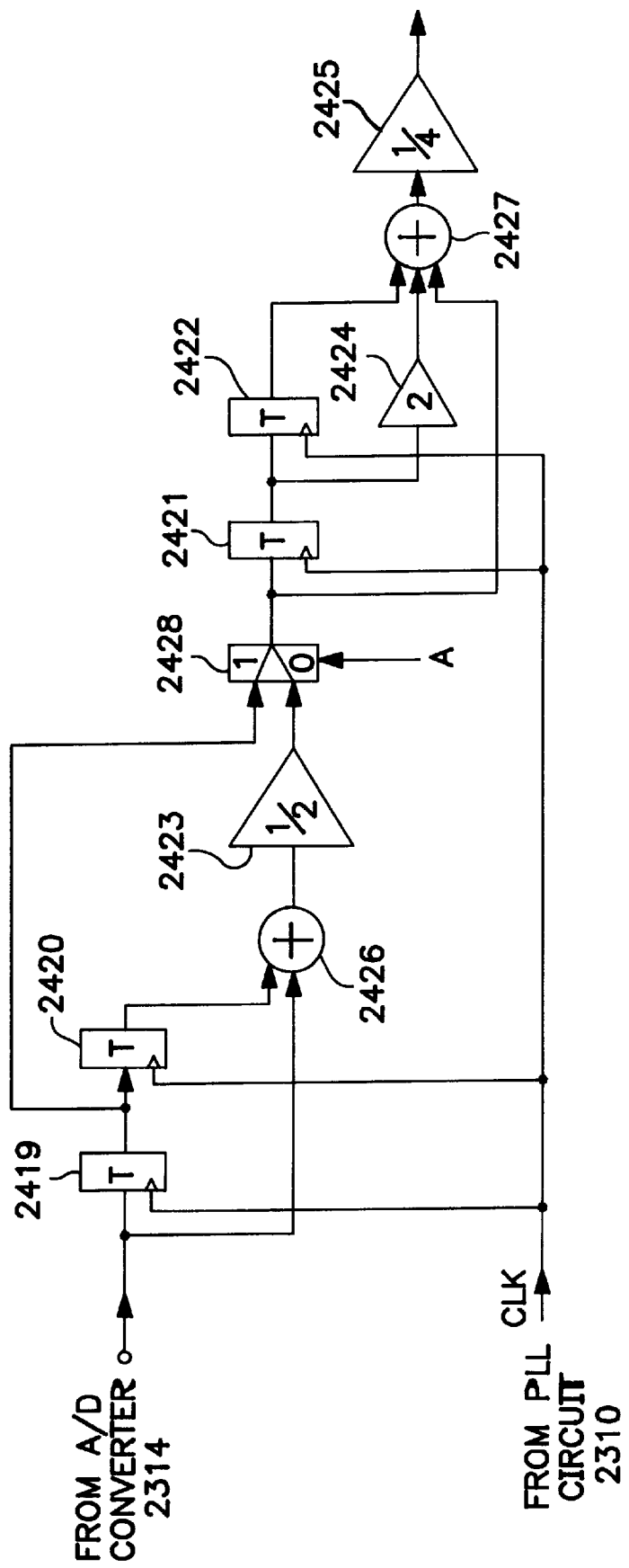
FIG. 24 is a block diagram of a digital LPF used in a pixel conversion apparatus in accordance with the eighth exemplary embodiment of the present invention.

FIG. 24 is a block diagram of a digital LPF 2315 used in horizontal pixel converter. A circuit example of digital LPF 2315 and its function are explained below, referring to FIG. 24. In FIG. 24, only one route of three signals (R, G and B) is described for simplicity but they are similar in the other two routes. The blocks 2419, 2420, 2421 and 2422 are flip-flop circuits. The blocks 2423, 2424 and 2425 are amplifiers. The blocks 2426 and 2427 are adders. The block 2428 is a selector. A combination of flip-flops 2419 and 2420, adder 2426 and amplifier 2423 composes a filter expressed by a following expression using a z-transformation.

$$y=(1+[z-2])/2,$$

where $[z-2]$ expresses a reciprocal of the square of z and a reciprocal of the n-th power of z is expressed as $[z-n]$, where n is a natural number. A combination of flip-flops 2421 and 2422, adder 2427 and amplifier 2424 similarly compose s a filter expressed by a following expression.

$$y=(1+2*[z-1]+[z-2])/4$$

When control signal A is L (low) level, only the filter after selector 2428 is effective. When control signal A is H (high) level, all the elements (blocks) shown in FIG. 24 is effective. That is, it forms an LPF having a following characteristic.

$$y=(1+2*[z-1]+2*[z-2]+2*[z-3]+[z-4])/8$$

Which control signal A is set at H level or L level depends on a conversion factor of the pixel conversion. For example, if the ratio of the number of pixels after A/D conversion at A/D converter 2314 to the number of pixels to be finally desired is smaller than 2, control signal A is desirable to set to L level and if it is larger than 2, control signal A is desirable to set to H level. Although two step switching of the bandwidth of digital LPF 2315 is adopted in the above composition for simplicity, the number of bandwidth switchings can be increased.

Figure 25:
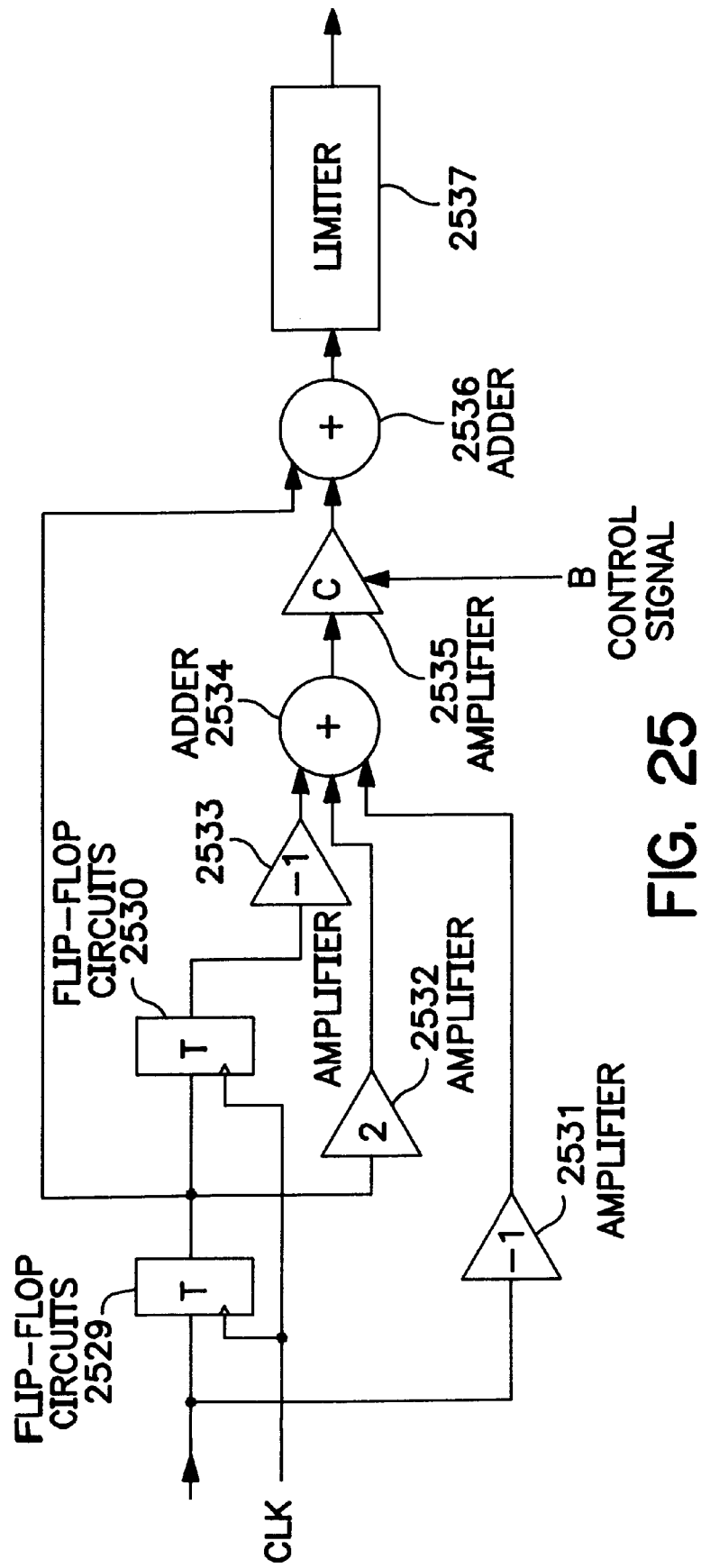
FIG. 25 is a block diagram of a peaking circuit used in a pixel conversion apparatus in accordance with the eighth exemplary embodiment of the present invention.

The blocks 2316 shown in FIG. 23 is a peaking circuit for amplifying a high frequency component of a picture. The signal B is a signal for controlling the amplification of a high frequency component in peaking circuit 2316. A concrete circuit example and the function of peaking circuit 2316 are explained below referring to FIG. 25. In FIG. 25, although only one route of three signal (R, G and B) is described for simplicity, the other two routes are the same as that.

The blocks 2529 and 2530 are flip-flop circuits. The blocks 2534 and 2536 are adders. The blocks 2531, 2532, 2533 and 2535 are amplifiers and the amplification factor C of amplifier 2535 is controlled by control signal B. The block 2537 is a limiter for limiting the output of adder 2536. A high pass filter is composed of flip-flop circuits 2529 and 2530, amplifiers 2531, 2532, 2533 and 2535 and adders 2534 and its characteristic is expressed by the following expression.

$$y=(-1+2*[z-1]-[z-2])/C$$

A signal which high frequency component is enforced is obtained by adding the above high frequency component and the output of flip-flop circuit 2529 at adder 2536.

The block 2317 shown in FIG. 23 is a circuit for processing interpolation between adjacent two pixels and generating a write control signal to memory 2318.

Figure 26:
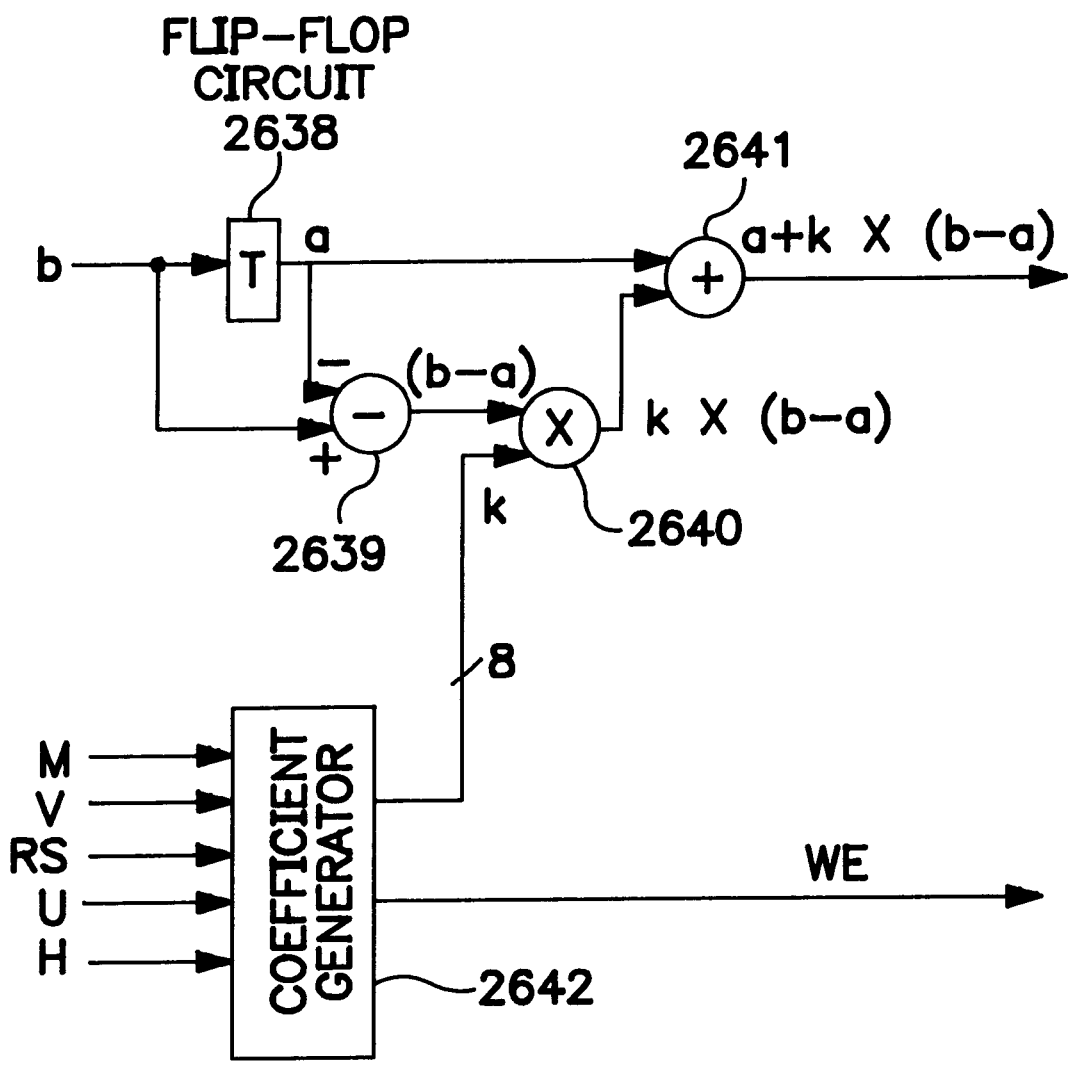
FIG. 26 is a block diagram of interpolation means/control means used in a pixel conversion apparatus in accordance with the eighth exemplary embodiment of the present invention.
Figure 27A:
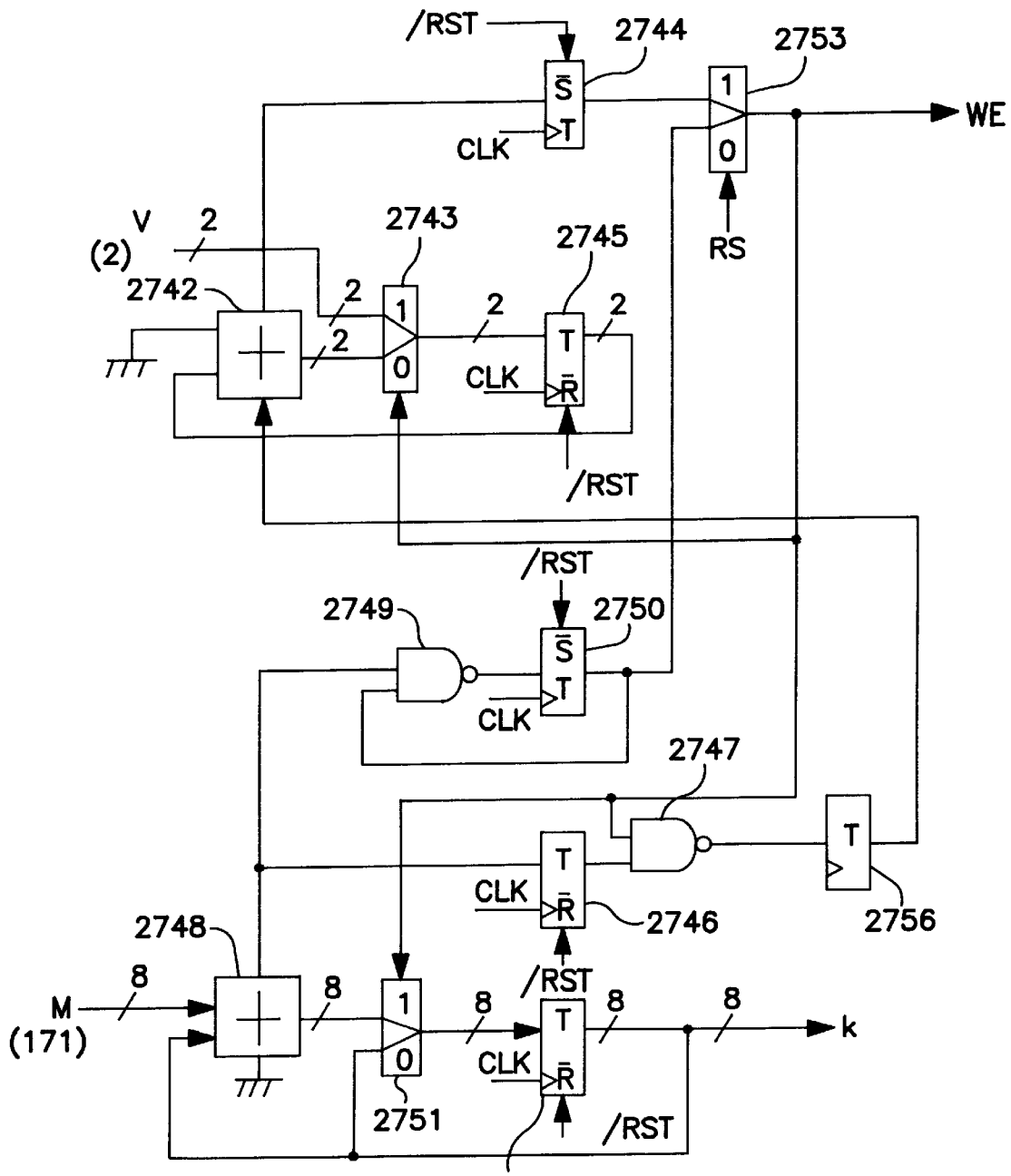
FIGS. 27(a) and 27(b) are block diagrams of a coefficient generation circuit used in a pixel conversion apparatus in accordance with the eighth exemplary embodiment of the present invention.
Figure 27B:
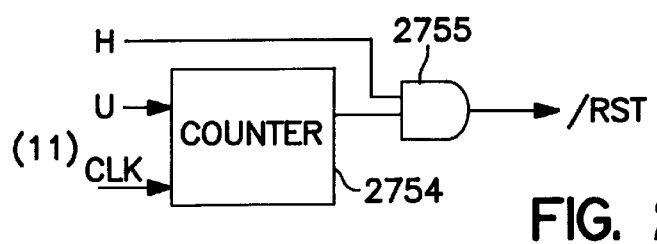

A concrete circuit example of interpolation means 2317 and its function are explained below, referring to FIGS. 26 and 27. FIG. 26 is a block diagram of interpolation means 2317 of a horizontal pixel converter in accordance with the present invention. FIGS. 27(*a*) and 27(*b*) are is a block diagrams of a coefficient generator 2642 used in interpolation means 2317.

A composition having a function of interpolation means to process interpolation between adjacent pixels and a function of control means to generate a write control signal to control writing to the memory to make the number of pixels to a desired number is explained below, referring to FIGS. 26, 27(*a*) and 27(*b*). Although only one route of three signals (R, G and B) is shown in FIG. 26 for simplicity, the other two signals are the same as the first signal route but coefficient generator 2642 may be made common for three signals.

In FIG. 26, the block 2638 is a flip-flop circuit. The block 2639 is an attenuator. The block 2640 is a multiplier. The block 2641 is an adder. The block 2642 is a coefficient generator for generating an input signal k of multiplier 2640 and a write control signal WE of memory 2318. Multiplier 2640 multiplies a signed signal of 9 bits ((b-a) in FIG. 26) by an unsigned signal of 8 bits (k in FIG. 26). The output is 8 bits but 8 bits of the lower order are rounded down and only 9 bits of upper order are supplied to adder 2641.

A concrete example of coefficient generator 2642 is explained below, referring to FIGS. 27(*a*) and 27(*b*). The blocks 2744 and 2750 are flip-flop circuits with set and when signal /RST is L level, an H level signal is outputted at the rising of the next clock, independent of the input to a flip-flop. The blocks 2745, 2746 and 2752 are flip-flop circuits with reset and when signal /RST is L level, an L level signal is outputted at the rising of the next clock, independent of the input to a flip-flop. The blocks 2743, 2751 and 2753 are selectors. The blocks 2742 and 2748 are adders and adder 2742 works with 2 bits and adder 2748 works with 8 bits. The blocks 2749 and 2747 are NAND gates. The block 2755 is an AND gate. The block 2754 is a counter and counts the clocks by setting the frequency dividing ratio to a designated value U and outputs a signal with a negative polarity at every dividing ratio. The input signal H of AND gate 2755 is a horizontal sync signal with a negative polarity.

How to set the conversion factor of the number of pixels is explained below. At A/D converter 2314, if (the number of pixels before conversion):(the number of pixels after conversion)=11:3, the ratio 11/3=3.6666 and its decimal part is 0.6666 and the integer part is 3. The decimal part of the above conversion factor is set for input signal M of adder 2748 of coefficient generator 2642 interpolation means 2317. Because M is an 8 bit signal (256 is the eighth power of 2), $$M=0.6666*256=170.6666=\text{about } 171.$$

Select signal RS of selector 2753 composing coefficient generator 2642 shown in FIG. 27 is set to 1 when the integer part of the conversion factor is not smaller than 2 and is set to 0 when the integer part is smaller than 2. The setting value V of selector 2743 is set to a value subtracting (the integer part of the conversion factor minus 1) from the n-th power of 2 when the number of bits of V is n. Because setting value V is decided as n=2 bits in this exemplary embodiment, $$V=4-(3-1)=2.$$

For input signal U to counter 2754, a fraction of the number of pixels before conversion as a numerator to the number of pixels after conversion as a denominator is reduced and then the numerator is set. In this exemplary embodiment, the fraction is 11/3 and because it is a reduced value, setting value U becomes 11. Counter 2754 is provided because decimal part M of the conversion factor includes an error. As a calculated result of the decimal part M is not always an integer as shown in the above setting example. Therefore, errors in the accumulated result of setting value M from flip-flop 2752 and adder 2748 are accumulated with the accumulation and a proper coefficient k can not be obtained. In order to prevent such an accumulation of errors, counter 2745 for generating a signal to initialize the interpolation processing with a proper timing is provided.

Because the interpolation processing is desirable to initialize at every horizontal period, an AND value of a negative horizontal sync signal H and an output signal of counter 2754 are calculated. This is used as an initializing signal /RST. The function of the circuit at such a setting is explained later, referring to a timing chart shown in FIGS. 28(*a*)–28(*o*).

In FIG. 23, the block 2318 is a memory having an enough capacity to store the pixels during a horizontal period after pixel conversion. It is written, synchronizing with a clock CLK but is not written when write control signal WE is L level.

The function of a horizontal pixel converter composed like the above is explained below, referring to FIGS. 23, 26, 27(*a*), 27(*b*), 28(*a*)–28(*o*) and 4. A signal that a ratio of the number of pixels after A/D conversion to the number of pixels after pixel conversion per horizontal period is 11:3 is considered. Signals in FIGS. 28(*a*)–28(*o*) (such as R and R2)

mean signals shown in FIGS. 23, 26, 27(a) and 27(b). Only about signal R is explained but also about signals G and B are similar to signal R.

Signal (FIG. 28(a)) is a signal generated at PLL circuit 2310 shown in FIG. 23 and is 80 MHz in this exemplary embodiment. It is independent of a clock signal originally generating input signal R. Input signal R is a signal inputted from computer or the like and generally has a rectangular waveform as shown in FIG. 28(b). Signal R2 has a waveform the high frequency component of which is cut from input signal R by passing analog LPF 2311. (Because input signal R is rectangular, a signal which the rising up and the falling down are sloped is outputted.) Signal R3 shown in FIG. 28(c) is a signal A/D converted from signal R2.

Signal R3 (FIG. 28(d)) is inputted to digital LPF 2315 shown in FIG. 23. In signal A controlling digital LPF 2315, the ratio of the number of pixels after A/D conversion to the number of pixels to be desired to finally obtain is 11/3= 3.6666 in this exemplary embodiment and because its integer part is not smaller than 2, it is H level.

Therefore, the output signal R4 of digital LPF 2315 becomes a signal shown in FIG. 28(e) and having a following filter characteristic.

$$y=(1+2*[z-1]+2*[z-2]+2*[z-3]+[z-4])/8$$

Because interpolation means 2317 at the rear stage is linearly interpolated between two points, digital LPF 2315 is absolutely necessary for proper interpolation but because the high frequency component is cut, if as it is, the boundary of the image becomes blurred when a signal with much high frequency component is displayed. To prevent it, the picture quality is improved by amplifying a high frequency component like that a boundary of letters is enforced by peaking circuit 2316. Signal b is a signal after its high frequency component is amplified. Control signal B of peaking circuit 2316 is a signal to control the amplification factor of amplifier 2535 shown in FIG. 25 and in this case, the amplification factor is set to 1 (that is, the signal passes through amplifier 2535 without any change). Therefore, the filter characteristic of peaking circuit 2316 is as follows.

$$y=-1+3*[z-1]+[z-2]$$

The output signal b is shown in FIG. 28(f).

Signal b is inputted to interpolation means 2317 shown FIG. 23. Signal a is an output of flip-flop circuit 2638 in interpolation means 2317 shown in FIG. 26. Signal (b-a) (FIG. 28(H)) is an output subtracted signal a (FIG. 28(g)) from signal b at subtracter 2639 shown in FIG. 26.

Figure 1:
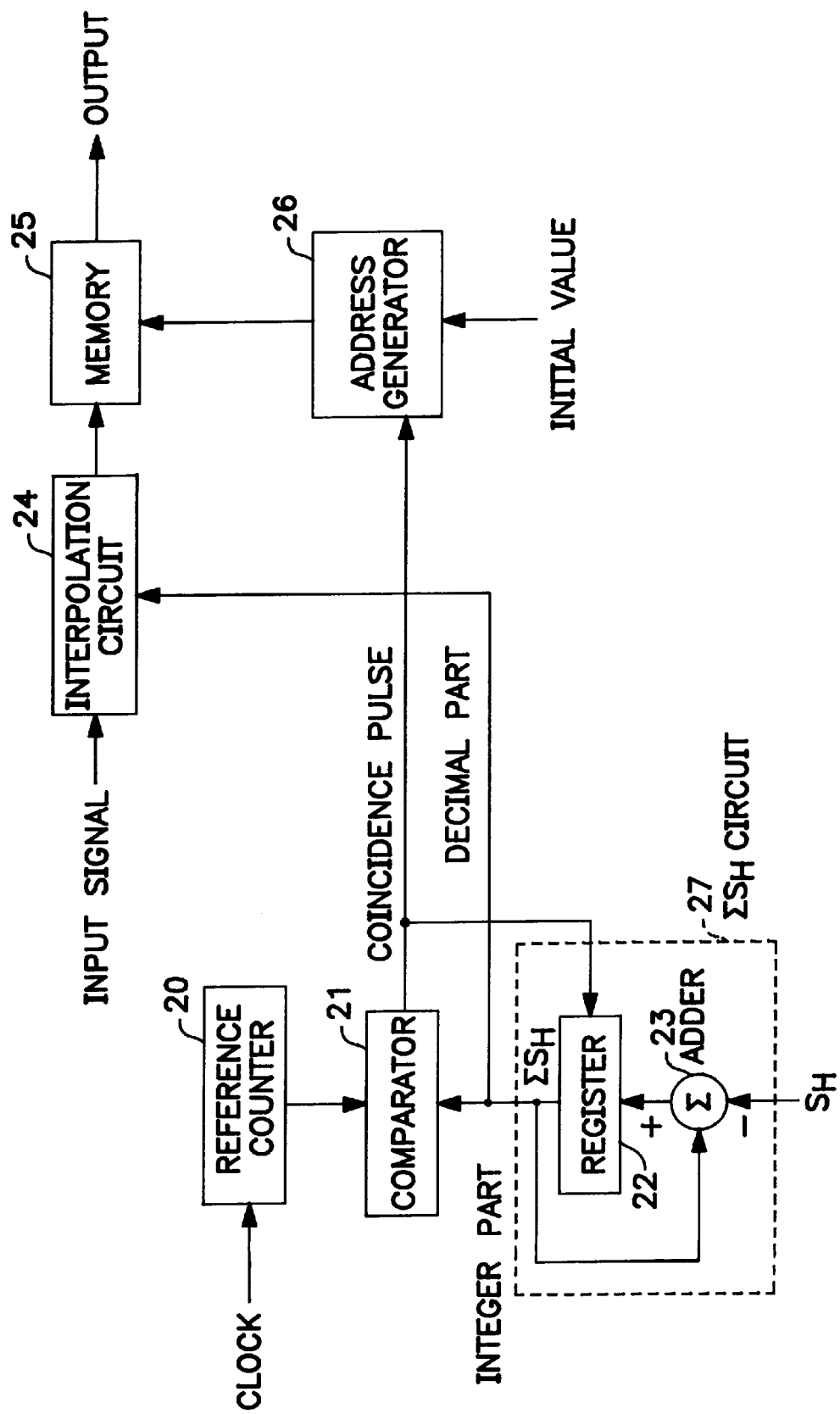
FIG. 1 is a block diagram of a pixel conversion apparatus in accordance with the prior art in the case of a reduction conversion.
Figure 2:
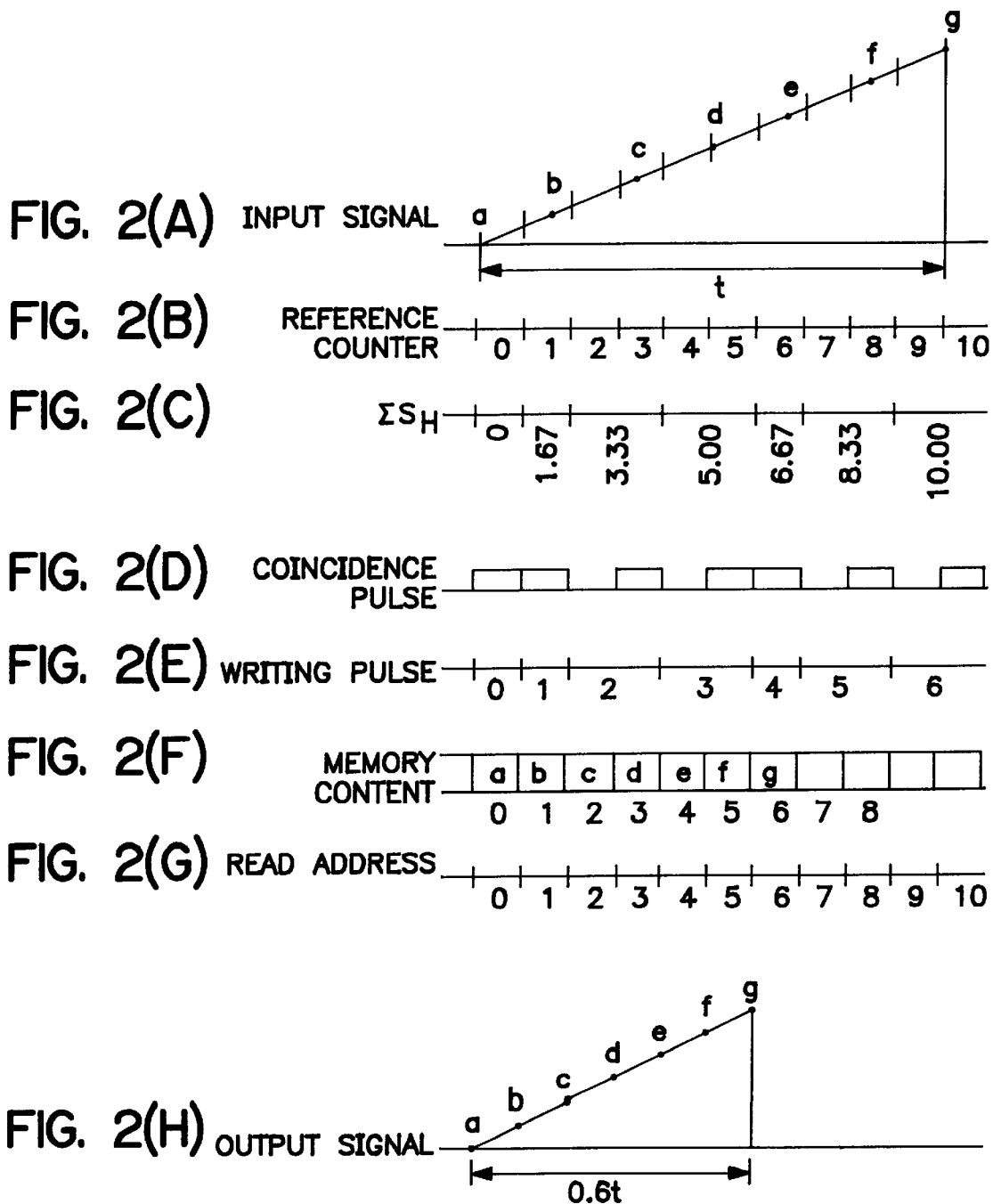
FIGS. 2(a)–2(h) are charts explaining a function of interpolating reduction conversion of a pixel conversion apparatus in accordance with the prior art in the case of reduction conversion.
Figure 3:
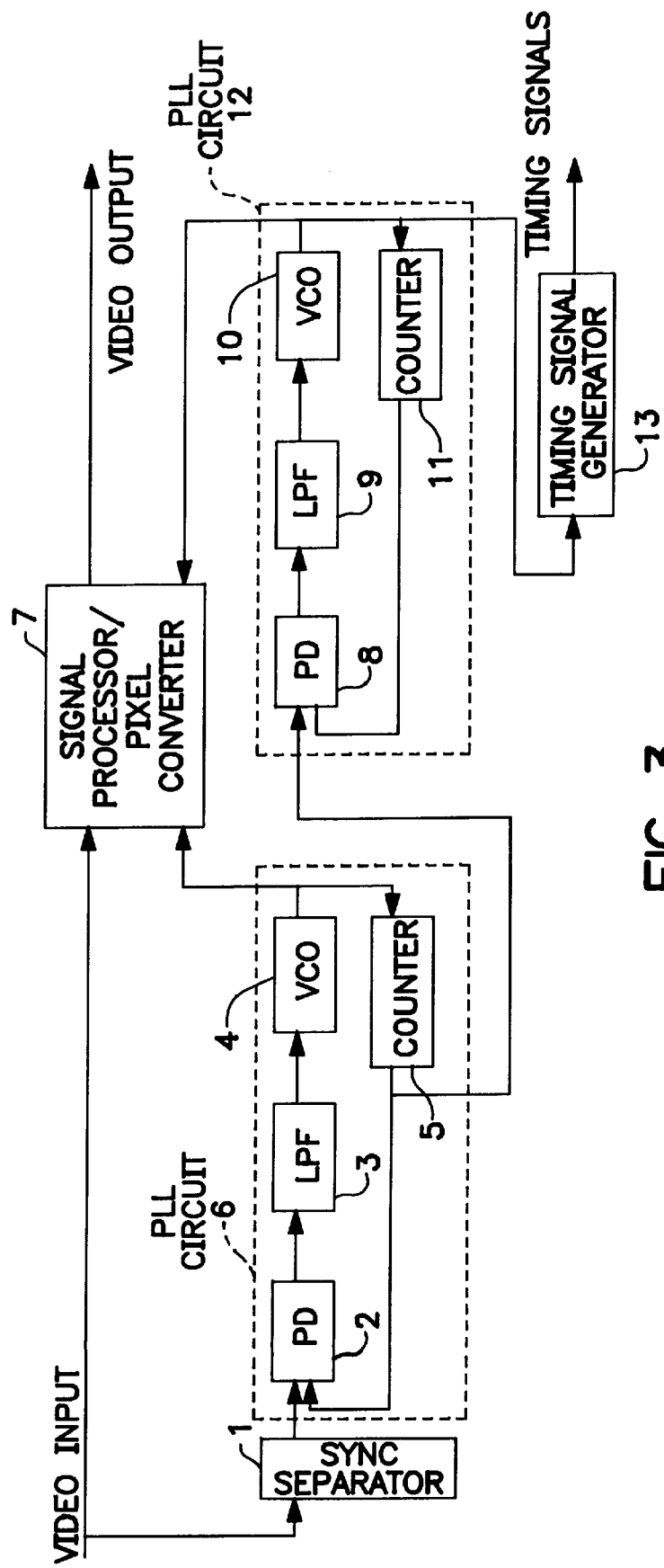
FIG. 3 is a block diagram of a picture display apparatus in accordance with the prior art.
Figure 4:
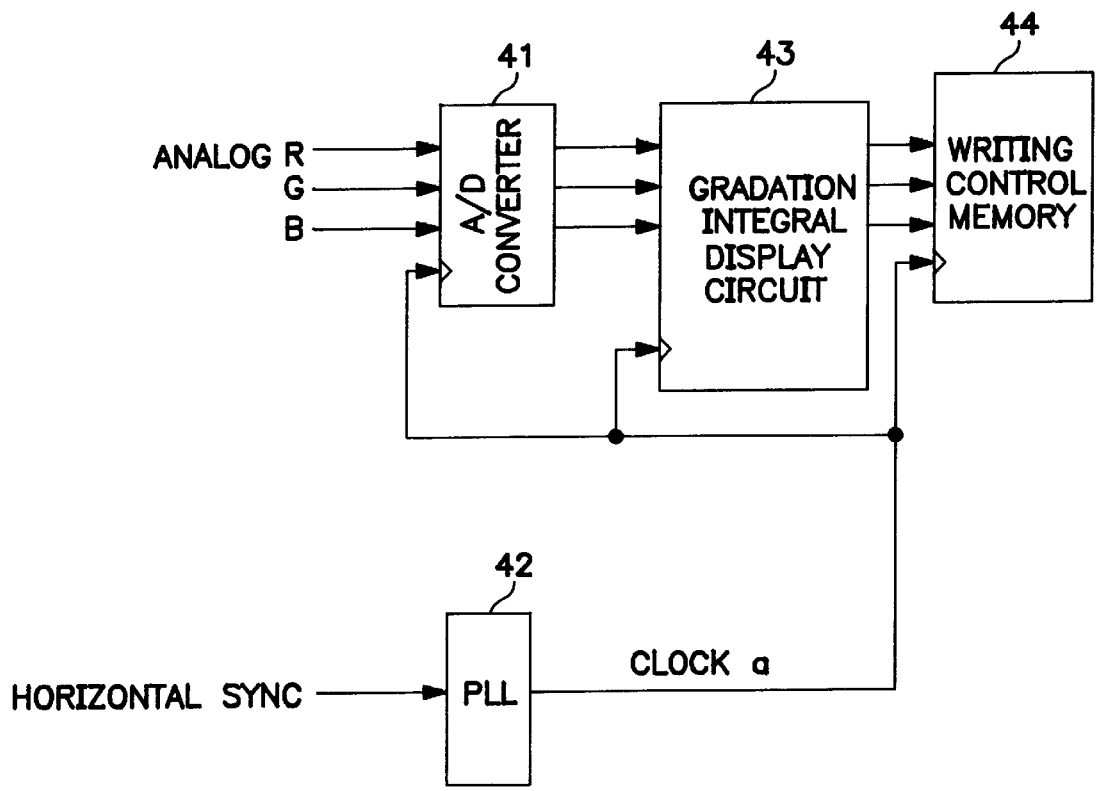
FIG. 4 is a block diagram of a horizontal pixel conversion circuit in accordance with the prior art.
Figure 5A:
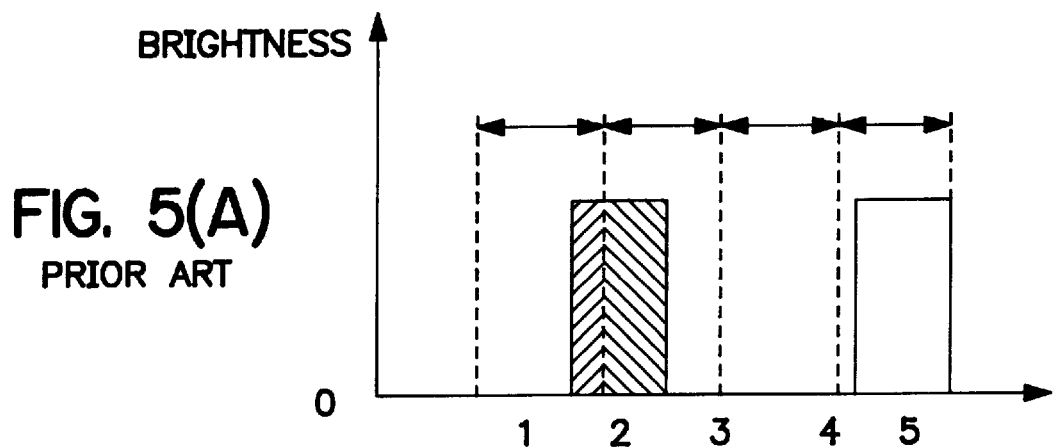
FIGS. 5(a) and 5(b) are charts explaining a function of horizontal pixel conversion a pixel conversion apparatus in accordance with the prior art in the case of reduction conversion.
Figure 5B:
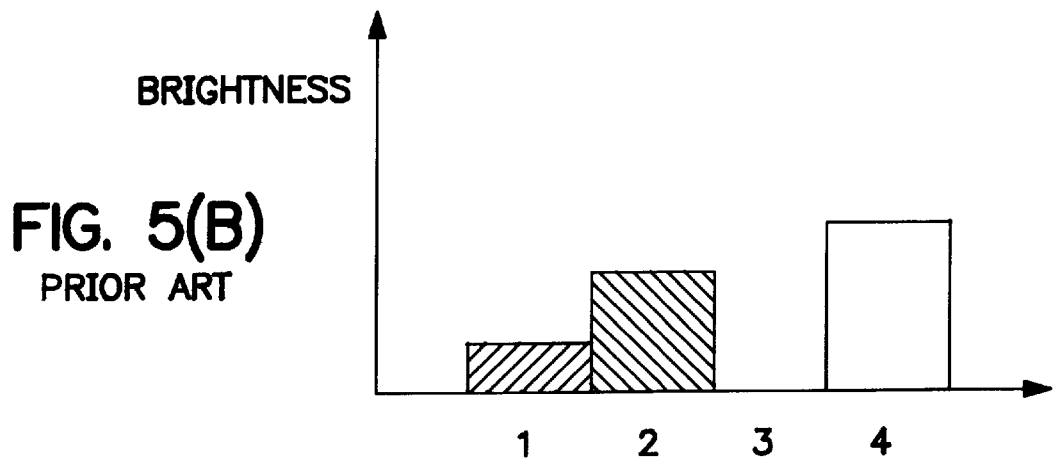

Signal k and signal WE outputted from coefficient generator 2642 shown in FIG. 26 are explained below, referring to FIGS. 27 and 4. Because the conversion factor is 3.6666 (=11/3), RS=1 and V=2. Further, frequency dividing ratio U is decided to be 11 because 11 pixels are converted into 3 pixels. The output signals k and WE as well as signal /RST for a reference are shown in FIGS. 28(i), 28(k) and 28(k), respectively. Signal/RST is L level at every 11 clocks because the frequency dividing ratio of counter 2754 is 11.

In FIG. 26, multiplier 2640 multiplies output k of coefficient generator 2642 by the output (b-a) of subtracter 2639. The multiplied output is originally 17 bits (signed) but the lower 8 bits are rounded down. Signal a and the upper 9 bits of the output signal of multiplier 2640 (FIG. 28(l)) are added at adder 2641 and the added signal c (FIG. 28(m)) is supplied to memory 2318 shown in FIG. 23. Not all of signal c is written in memory 2318 and writing is done only when signal WE outputted from coefficient generator 2642 is H level. Therefore, if the stored content of memory 2318 is continuously read with a timing of signal WE, signal d which is a final result is obtained (FIG. 28(n)). A drawing taking digital value s of signal d as an ordinate is attached under digital signal d shown in FIG. 28(o) to be easy to compare digital signal d with input signal R.

According to the above composition, even the number of pixels per one horizontal period of a video signal from a computer or the like is unknown, the sampling clock frequency of A/D conversion can be arbitrarily set, no restriction is required for the PLL circuits and further, proper pixel conversion can be obtained.

Thus, according to a horizontal pixel converter in accordance with the eighth exemplary embodiment of the present invention, because it is unnecessary to previously know an input signal system and the original frequency and phase of a clock signal forming the input video signal and the oscillation frequency of the PLL circuit can be made almost constant to arbitrarily set the sampling frequency of the A/D converter, proper pixel conversion is possible without requesting any high performance for the PLL circuits.

What is claimed:

1. A pixel conversion apparatus for use with a display and an input video signal having a sync signal, said apparatus comprising:

sync separation means for separating the sync signal from said input video signal;

pixel conversion means for i) determining how to convert pixels of said input video signal and ii) converting said pixels into further pixels;

timing generation means for generating a timing signal for displaying an image according to an output of said sync separation means and an output of said pixel conversion means;

interpolation means for interpolating at least a portion of said further pixels from said pixel conversion;

sync signal generation means for generating a sync signal for displaying said input video signal as said image on said display;

said pixel conversion means i) determines the number of pixels and an effective area of said input video signal and ii) calculates a blanking period of the displayed image, and a timing of a horizontal sync signal from said sync signal generation means is different between a portion of said input video signal which corresponds to said effective area and a further portion of said input video signal which corresponds to said blanking period;

said timing generation means provides a number of clocks constituting one line for displaying said image on said display within said effective video area different from a number of clocks constituting one line for displaying said image within said blanking period such that the number of lines in the converted video signal is adjusted to a number of lines required for said display; and the timing difference of the horizontal sync signal is based on the difference in the number of clocks for one line.

2. A pixel conversion apparatus for use with a display and an input video signal having a sync signal, said apparatus comprising:

sync separation means for separating the sync signal from said input video signal;

pixel conversion means for i) determining how to convert pixels of said input video signal and ii) converting said pixels into further pixels;

timing generation means for generating a timing signal for displaying an image according to an output of said sync separation means and an output of said pixel conversion means;

interpolation means for interpolating at least a portion of said further pixels from said pixel conversion;

sync signal generation means for generating a sync signal for displaying said input video signal as said image on said display;

a timing of a horizontal sync signal within an effective video area of said displayed image is different from a timing of said horizontal sync signal within a blanking period of said displayed image when a number of scanning lines of the input video signal is converted to another number of scanning lines;

said timing generation means provides a number of clocks constituting one line for displaying said image on said display within said effective video area different from a number of clocks constituting one line for displaying said image within said blanking period such that the number of lines in the converted video signal is adjusted to a number of lines required for said display; and the timing difference of the horizontal sync signal is based on the difference in the numbers of clocks for one line.

* * * * *